United States Patent
Nair et al.

(10) Patent No.: US 10,696,814 B2
(45) Date of Patent: Jun. 30, 2020

(54) METHOD OF MAKING LIGHT-BLOCKING ARTICLES

(71) Applicant: Eastman Kodak Company, Rochester, NY (US)

(72) Inventors: Mridula Nair, Penfield, NY (US); Lloyd Anthony Lobo, Lincoln University, PA (US); Kevin M. Donovan, Bergen, NY (US)

(73) Assignee: EASTMAN KODAK COMPANY, Rochester, NY (US)

( * ) Notice: Subject to any disclaimer, the term of this patent is extended or adjusted under 35 U.S.C. 154(b) by 115 days.

(21) Appl. No.: 16/018,367

(22) Filed: Jun. 26, 2018

(65) Prior Publication Data

US 2019/0390029 A1 Dec. 26, 2019

(51) Int. Cl.

| | |
|---|---|
| *C08J 9/236* | (2006.01) |
| *C08J 9/30* | (2006.01) |
| *C08J 9/00* | (2006.01) |
| *C08K 3/013* | (2018.01) |
| *C08K 3/22* | (2006.01) |
| *C08K 3/26* | (2006.01) |
| *C08K 3/30* | (2006.01) |
| *C08J 9/28* | (2006.01) |

(52) U.S. Cl.
CPC ............ *C08J 9/236* (2013.01); *C08J 9/0061* (2013.01); *C08J 9/0066* (2013.01); *C08J 9/28* (2013.01); *C08J 9/30* (2013.01); *C08K 3/013* (2018.01); *C08K 3/22* (2013.01); *C08K 3/26* (2013.01); *C08K 3/30* (2013.01); *C08J 2201/026* (2013.01); *C08J 2301/02* (2013.01); *C08J 2329/04* (2013.01); *C08J 2333/02* (2013.01); *C08J 2339/06* (2013.01); *C08J 2365/04* (2013.01); *C08J 2375/04* (2013.01); *C08K 2003/2241* (2013.01); *C08K 2003/265* (2013.01); *C08K 2003/3045* (2013.01); *C08K 2201/005* (2013.01)

(58) Field of Classification Search
CPC ........ C08J 9/0061; C08J 9/0066; C08J 9/236; C08J 9/28; C08J 9/30; C08J 2201/026; C08J 2301/02; C08J 2329/04; C08J 2333/02; C08J 2339/06; C08J 2375/04; C08J 2365/04; C08K 3/013; C08K 3/22; C08K 3/26; C08K 3/30; C08K 2003/2241; C08K 2003/265; C08K 2003/3045; C08K 2201/005; D06N 3/00
See application file for complete search history.

(56) References Cited

U.S. PATENT DOCUMENTS

| | | | |
|---|---|---|---|
| 3,607,341 A | 9/1971 | Goins et al. | |
| 3,713,868 A | 1/1973 | Gordon et al. | |
| 4,137,380 A | 1/1979 | Gunning et al. | |
| 4,439,473 A | 3/1984 | Lippman | |
| 4,457,980 A | 7/1984 | Daniels et al. | |
| 4,677,016 A | 6/1987 | Ferziger et al. | |
| 5,741,582 A | 4/1998 | Leaderman et al. | |
| 8,329,783 B2 | 12/2012 | Nair et al. | |
| 9,469,738 B1 * | 10/2016 | Nair ..................... | C09D 7/65 |
| 9,891,350 B2 | 2/2018 | Lofftus et al. | |
| 9,963,569 B2 | 5/2018 | Nair et al. | |
| 2012/0167666 A1 | 7/2012 | Nair et al. | |
| 2015/0093512 A1 | 4/2015 | Brunner et al. | |
| 2015/0234098 A1 | 8/2015 | Lofftus et al. | |
| 2018/0051155 A1 | 2/2018 | Nair et al. | |
| 2018/0094112 A1 | 4/2018 | Nair et al. | |
| 2018/0327964 A1 | 11/2018 | Nair et al. | |

FOREIGN PATENT DOCUMENTS

| | | |
|---|---|---|
| CN | 107 663 024 A | 2/2018 |
| EP | 1380616 A1 | 1/2004 |
| EP | 3 354 481 A1 | 8/2018 |
| WO | 2013/138158 A1 | 9/2013 |
| WO | 2018/034860 | 2/2018 |
| WO | 2020/005528 A1 | 1/2020 |

* cited by examiner

*Primary Examiner* — Christopher M Rodd
(74) *Attorney, Agent, or Firm* — J. Lanny Tucker

(57) ABSTRACT

Foamed, opacifying elements are prepared using a foamable aqueous composition containing porous particles and an opacifying colorant. This composition is aerated, disposed onto a substrate, and dried. The dry foamed composition is densified, and cured in either order. At some point after the drying feature, a functional composition is disposed onto either the dry foamed composition or the opacifying layer, and dried. This functional composition has either or both of: (i) inorganic or organic spacer particles having a mode particle size of 1 to 100 μm, and which inorganic or organic spacer particles resist melt flow at a pressure of up to and including 100 psi (689.5 kPa) and a temperature of up to and including 220° C.; and (iii) a tinting material comprising a pigment, dye, or a combination thereof. The (i) inorganic or organic spacer particles and the (iii) tinting material are different materials.

23 Claims, No Drawings

METHOD OF MAKING LIGHT-BLOCKING ARTICLES

RELATED APPLICATIONS

Reference is made to the following copending and commonly assigned patent applications:

U.S. Ser. No. 16/018,332,(filed Jun. 26, 2018, by Nair, Lobo, and Donovan), entitled "Light-Blocking Articles with Spacer Functional Composition";

U.S. Ser. No. 16/108,350, (filed Jun. 26, 2018, by Lobo, Nair, and Donovan), entitled "Light-Blocking Articles with Tinted Functional Composition"; and U.S. Ser. No. 15/943,770 (filed Apr. 3, 2018 by Nair, Brick and Sedita) that is a Continuation-in-part of U.S. Pat. No. 9,965,569;

the disclosures of all which applications are incorporated herein by reference.

FIELD OF THE INVENTION

In general, this invention relates to method of making light-blocking articles such as shades, curtains, and other coated articles used to block ambient light. More specifically, this invention relates to making foamed, opacifying elements having a functional composition disposed on an opacifying layer. The functional composition can serve various functions and provide unique properties to the foamed, opacifying elements.

BACKGROUND OF THE INVENTION

In general, when light strikes a surface, some of it may be reflected, some absorbed, some scattered, and the rest transmitted. Reflection can be diffuse, such as light reflecting off a rough surface such as a white wall, in all directions, or specular, as in light reflecting off a mirror at a definite angle. An opaque substance transmits almost no light, and therefore reflects, scatters, or absorbs all of it. Both mirrors and carbon black are opaque. Opacity depends on the frequency of the light being considered. "Blackout" or light blocking materials typically refer to coated layers in articles that are substantially impermeable to light such as visible or UV radiation. Thus, when a blackout material such as a blackout curtain or shade is hung over a window, it generally blocks substantially all external light from entering the room through that window. Blackout materials are suitable as curtains and shades for domestic use, for institutional use in hospitals and nursing homes, as well as for use in commercial establishments such as hotels, movie theaters, and aircraft windows where the option of excluding light can be desirable.

Light blocking articles such as the blackout curtains or shades can be comprised of a fabric (porous) substrate coated with more than one layer of a foamed latex composition. There is a desire for these curtains, in addition to blocking transmitted light, to have a light color (hue) facing the environment where an activity needs illumination in order to minimize the amount of artificial lighting needed to perform the activity. An example is when the function of the blackout material is to separate two areas of activity where one or both areas can be artificially lit at the same time. More often than not, the function of a blackout curtain is to prevent sunlight from entering a room through a building window. It can also be desirable for the color (hue) of the side facing the window to match the external décor of the building.

Porous fabrics are derived from yarns of manmade or naturally-occurring threads that are woven or knitted together. Threads used to make yarn are often twisted together to form the threads. Synthetic plastic coating materials, such as polyvinyl chloride, led to the emergence of fabrics woven from plastic coated yarns. Such fabrics have increased durability and wear properties compared to fabrics made from naturally-occurring fibers. One use for such fabrics is window shades especially for commercial and hospital sites.

Light colored blackout curtains theoretically can be made by coating porous fabrics with light colored foams containing light scattering pigments such as titanium dioxide or clays. However, very thick foam coatings will be needed to create blackout curtains through which the sun is not visible in a darkened room using only these pigments. A method that is practiced for reducing the weight of such blackout materials is to sandwich a light-absorbing, foamed black or grey pigment, such as a carbon black layer between two foamed light scattering, white pigment-containing layers.

When an electromagnetic radiation blocking coating has, as it often does, a strongly light absorbing material containing black pigments such as carbon black, between two reflective layers, it has at least two distinct problems. First, such coatings require three or more separate coating operations that reduce manufacturing productivity and increase unit costs. Secondly, carbon black in the light absorbing middle layer can become "fugitive" (or non-enclosed) from some puncture or tear occurring during sewing or laundering, and soil other layers such as the reflective layers, which is highly objectionable. Additionally, the stitches generated in the materials during sewing can cause the fugitive carbon from the light absorbing layer to spread over a larger area thereby increasing the area of objectionable shading of the light-colored surface.

U.S. Pat. No. 7,754,409 (Nair et al.), U.S. Pat. No. 7,887,984 (Nair et al.), U.S. Pat. No. 8,252,414 (Putnam et al.), and U.S. Pat. No. 8,329,783 (Nair et al.) describe porous polymer particles that are made by a multiple emulsion process, wherein the multiple emulsion process provides formation of individual porous particles comprising a continuous polymer phase and multiple discrete internal pores, and such individual porous particles are dispersed in an external aqueous phase. The described Evaporative Limited Coalescence (ELC) process is used to control the particle size and distribution while a hydrocolloid is incorporated to stabilize the inner emulsion of the multiple emulsion that provides the template for generating the pores in the porous particles.

U.S. Pat. No. 9,891,350 (Lofftus et al.) describes improved articles that are designed with an opacifying layer that is capable of blocking predetermined electromagnetic radiation. The opacifying layer is disposed on a substrate that can be composed of any suitable material and an underlying layer can be incorporated between the substrate and the opacifying layer. While these articles have numerous advantages, and represent an important advance in the art, there is a need for further improvement in providing opacifying articles that are lighter in weight; and that have improved flexibility, good "hand," while maintaining light coloration of the surfaces facing an observer without losing reflectivity, and light-absorptive properties; launderability; and minimizing dark opacifying agents getting out into the environment upon stitching and handling.

An improvement in this art is provided by the foamed aqueous compositions described in U.S. Pat. No. 9,469,738 (Nair et al.) in which very small amounts of opacifying colorants incorporated into porous particles can be incorporated into a latex foam, and the resulting composition has a foam density of at least 0.1 g/cm$^3$.

U.S. Pat. No. 9,963,569 (Nair et al) describes a method for providing a foamed, opacifying element includes providing a foamable aqueous latex composition comprising porous particles incorporating within them very small amounts of opacifying colorants, aerating it to a specific foam density, applying the foamed aqueous latex composition to a porous substrate, drying, and densifying the dried layer.

U.S. Pat. No. 4,677,016 (Ferziger) describes a foam-coated, tightly woven fiberglass fabric where at least one surface thereof is coated with one or more layers of a flame retardant foamed latex coating composition. At least one of the foam coating layers is opaque and comprises a cured layer of flame retardant polymeric latex foam.

Common problems encountered by foamed and dried latex compositions for opacifying elements containing matrix materials derived from binder materials with glass transition temperatures less than 25° C. include: self-adherence of the opacifying layer; sticking of the opacifying layer to manufacturing and processing devices; lack of antistatic properties of the opacifying layer; and compromised release of the opacifying layer from a blanket belt during dye sublimation thermal transfer printing process on the face side, resulting in unwanted blanket belt contamination at the required high printing temperatures.

Thus, there is a continued need for improvements in known light-blocking articles to avoid these problems.

SUMMARY OF THE INVENTION

The present invention provides a method for providing a foamed, opacifying element, the method consisting essentially of:
A) providing a foamable aqueous composition that has at least 35% solids and up to and including 70% solids, and consists essentially of:
  (a) at least 0.05 weight % and up to and including 15 weight % of porous particles, each porous particle comprising a continuous polymeric phase and discrete pores dispersed within the continuous polymeric phase, the porous particles having a mode particle size of at least 2 μm and up to and including 50 μm;
  (b) at least 20 weight % and up to and including 70 weight % of a binder material having a glass transition temperature ($T_g$) of less than 25° C.;
  (c) at least 0.0001 weight % and up to and including 30 weight % of one or more additives comprising a surfactant;
  (d) water;
  (e) at least 0.001 weight % of an opacifying colorant different from all the one or more (c) additives, which opacifying colorant absorbs electromagnetic radiation having a wavelength of at least 380 nm and up to and including 800 nm,
  all amounts based on the total weight of the foamable aqueous composition;
B) aerating the foamable aqueous composition to provide a foamed aqueous composition having a foam density of at least 0.1 g/cm$^3$ and up to and including 0.5 g/cm$^3$;
C) disposing the foamed aqueous composition onto a first opposing surface of a substrate also having a second opposing surface;
D) drying the foamed aqueous composition, without substantial curing of the binder material, to provide a dry foamed composition on the first opposing surface;
E) densifying the dry foamed composition;
F) curing the dry foamed composition to convert the (b) binder material to a (b') matrix material,
wherein E) densifying and F) curing can be carried out in the indicated order or in the opposite order, to provide a foamed, opacifying element having an opacifying layer, and
wherein, at any time after D) drying, the method further comprises
G) disposing a functional composition onto either the dry foamed composition or the opacifying layer, and drying the disposed functional composition,
the functional composition comprising either or both of: (i) inorganic or organic spacer particles having a mode particle size of at least 1 μm and up to and including 100 μm, and which inorganic or organic spacer particles resist melt flow at a pressure of up to and including 100 psi (689.5 kPa) and a temperature of up to and including 220° C.; and (iii) a tinting material comprising one or more pigments, one or more dyes, or a combination thereof, wherein the (i) inorganic or organic spacer particles and the (iii) tinting material are different materials.

The present invention utilizes foamable and foamed aqueous compositions to provide foamed, opacifying elements such as window shades, curtains, and other light-blocking materials that contain low amounts of opacifying colorants. The foamed, opacifying elements prepared according to the present invention comprise a functional composition disposed over (in some embodiments directly on) the light-blocking, opacifying layer.

This functional composition allows the use of foamed and dried latex compositions in the foamed, opacifying elements containing matrix materials derived from binder materials having glass transition temperatures less than 25° C. with a reduction in the problems described above. For example, the present invention reduces the problem of blocking (sticking) when wound up in a roll or folded face-to-face. Sticking of the opacifying layer can also be a problem when its face contacts manufacturing, processing, or printing devices. Blocking causes static cling and further compromises release of the opacifying layer from a blanket belt that is used during dye sublimation thermal transfer printing processes on the face side of the fabric. The present invention reduces this blocking problem, resulting in less blanket belt contamination at the required high dye sublimation thermal transfer printing temperatures.

A functional composition according to the present invention that contains inorganic or organic spacer particles can mitigate the problem of the opacifying layer sticking to surfaces with the presence of microscopic protrusions or asperities that help minimize surface contact between the opacifying layer and any other solid surface.

In some embodiments, the functional composition can also be used to modify the color or hue of the surface of the light-blocking, opacifying layer by the incorporation of an appropriate tinting material, with or without the inorganic or organic spacer particles.

DETAILED DESCRIPTION OF THE INVENTION

The following discussion is directed to various embodiments of the present invention and while some embodiments can be desirable for specific uses, the disclosed embodiments should not be interpreted or otherwise considered to limit the scope of the present invention, as claimed below. In addition, one skilled in the art will understand that the following disclosure has broader application than is explicitly described for any specific embodiment.

Definitions

As used herein to define various components of the foamed aqueous composition, foamable aqueous composition, functional compositions, or materials used to prepare the porous particles, unless otherwise indicated, the singular forms "a," "an," and "the" are intended to include one or more of the components (that is, including plurality referents).

Each term that is not explicitly defined in the present application is to be understood to have a meaning that is commonly accepted by those skilled in the art. If the construction of a term would render it meaningless or essentially meaningless in its context, the term definition should be taken from a standard dictionary.

The use of numerical values in the various ranges specified herein, unless otherwise expressly indicated otherwise, are considered as approximations as though the minimum and maximum values within the stated ranges were both preceded by the word "about." In this manner, slight variations above and below the stated ranges can be used to achieve substantially the same results as the values within the ranges. In addition, the disclosure of these ranges is intended as a continuous range including every value between the minimum and maximum values.

Unless otherwise indicated, the terms "foamed, opacifying element," "light-blocking element," and "element" are intended to be synonymous terms that refer to the same article.

Unless otherwise indicated, the terms "foamed aqueous composition" and "composition" are intended to be synonymous terms and to refer to the same material, and are different from a "functional composition" as described below.

The terms "porous particle" and "porous particles" are used herein, unless otherwise indicated, to refer to porous organic polymeric materials useful in the foamable aqueous compositions, foamed aqueous compositions, and foamed, opacifying elements according to the present invention. The porous particles generally comprise a solid continuous polymeric phase having an external particle surface and discrete pores dispersed within the continuous polymeric phase. The continuous polymeric phase also can be chemically crosslinked or elastomeric in nature, or both chemically crosslinked and elastomeric in nature.

The continuous polymeric phase of the porous particles generally has the same composition throughout that solid phase. That is, the continuous polymeric phase is generally uniform in composition including any materials [for example, (e) opacifying colorant] that can be incorporated therein. In addition, if mixtures of organic polymers are used in the continuous polymeric phase, generally those mixtures also are dispersed uniformly throughout.

The term "porogen" refers to a pore forming agent used to make porous particles for use in the present invention. For example, a porogen can be the aqueous phase of water-in-oil emulsions (that is in the first emulsion), along with a pore stabilizing hydrocolloid, or any other additive in the aqueous phase that can act as the template for creation of pores and modulate the porosity of the porous particles.

As used in this disclosure, the term "isolated from each other" refers to the different (discrete) pores of same or different sizes that are separated from each other by some material of the continuous polymeric phase, and such pores are not interconnected. Thus, "discrete" pores refer to "individual" or "closed," non-connected pores or voids distributed within the continuous polymeric phase.

When used herein, the terms "first discrete pore" and "second discrete pore" refer to distinct sets of individual pores in the porous particles. Each distinct set of pores includes a plurality of discrete pores, each of which discrete pores is isolated from others discrete pores in the distinct set of pores, and the discrete pores of each distinct set of pores are isolated from all other discrete pores of the other distinct sets of pores in the porous particle. Each distinct set of pores can have the same mode average size or both sets can have the same mode average size. For making such porous particles, the word "discrete" can also be used to define different droplets of the first and second aqueous phases when they are suspended in the oil (solvent) phase (described below).

Where there are different sets of discrete pores, the discrete pores of a first set can be predominantly nearer then external particle surface compared to the discrete pores of a second set. For example, a set of smaller discrete pores can be predominantly close to the external particle surface compared to a set of larger discrete pores. As used herein, the term "predominant" means that a larger number fraction of discrete pores of one size is found in a "shell" area nearer the surface of the porous particle than one would expect based on the total number fraction of the two or more types (sizes) of discrete pores present in the porous particle.

The porous particles can include "micro," "meso," and "macro" discrete pores, which according to the International Union of Pure and Applied Chemistry, are the classifications recommended for discrete pore sizes of less than 2 nm, from 2 nm to 50 nm, and greater than 50 nm, respectively. Thus, while the porous particles can include discrete pores of all sizes and shapes (that is, discrete pores entirely within the continuous polymeric phase) providing a suitable volume in each discrete pore, macro discrete pores are particularly useful. While there can be open macro pores on the surface of the porous particle, such open pores are not desirable and are present only by accident. The size of the porous particle, the formulation, and manufacturing conditions are the primary controlling factors for discrete pore size. However, typically the discrete pores independently have an average size of at least 100 nm and up to and including 7,000 nm, or more likely at least 200 nm and up to and including 2,000 nm. Whatever the size of the discrete pores, they are generally distributed randomly throughout the continuous polymeric phase. If desired, the discrete pores can be grouped predominantly in one part (for example, "core" or "shell") of the porous particles.

The porous particles used in this invention generally have a porosity of at least 20 volume % and up to and including 70 volume %, or likely at least 35 volume % and up to and including 65 volume %, or more typically at least 40 volume % and up to an including 60 volume %, all based on the total porous particle volume. Porosity can be measured by a modification of the known mercury intrusion technique.

"Opacity" is a measured parameter of a foamed, opacifying element according to the present invention that characterizes the extent of transmission of electromagnetic radiation such as visible light. A greater opacity indicates a more efficient blocking (hiding) of electromagnetic radiation (as described below). In the present invention, the "opacity" of a foamed, opacifying element is quantitated by measuring the optical density (OD), described below with the Examples, which determines the extent to which the impinging radiation or light is blocked by the foamed, opacifying element. The higher the OD, the greater the light blocking ability exhibited by the foamed, opacifying element.

Glass transition temperatures of the organic polymers used to prepare the continuous polymeric phase, or the inorganic or organic spacer particles, can be measured using Differential Scanning calorimetry (DSC) using known procedures. For many commercially available organic materials, the glass transition temperatures are known from the suppliers.

Polymer viscosity (in centipoise or mPa-sec) comprising the continuous polymeric phase can be measured in ethyl acetate at concentration of 20 weight % of the polymer at 25° C. in an Anton Parr MCR 301 stress rheometer in a coquette using steady shear sweeps. Shear rate at 100 sec$^{-1}$ was calculated from the resulting graphical plot of viscosity vs. shear rate.

CIELAB L*, a*, and b* values described herein have the known definitions according to CIE 1976 color space or later known versions of color space and are determined using a standard D65 illuminant and known procedures. These values can be used to express a color as three numerical, L* for the lightness (or brightness) of the color, a* for the green-red component of the color, and b* for the blue-yellow component of the color values.

Delta E (ΔE) is a metric for understanding how the human eye perceives color difference or a measure of change in visual perception of two given colors. Moreover, ΔE is a color difference metric that is intended to correlate with human visual judgments of small differences in perceived color between two color stimuli. ΔE values vary from 0 to 100 where a value of 100 represents colors that are the exact opposite in the CIELAB color space. Delta E 2000 (or ΔE 2000) values are obtained from equations where the weighting of L* is varied depending on where in the lightness range the color falls.

"Openness" (Openness Factor, or OF) refers to how tight the weave is in a fabric material (or other substrate material), or the percentage of holes in a fabric construction, and is sometimes referred to as "weave density." The lower the OF, the less the light transmittance and the greater the visible light that is obstructed or blocked. It is the ratio between transparent and opaque surfaces and depends on the spacing and dimension of the yarn.

Unless otherwise indicated herein, the terms "first opposing surface" and "second opposing surface" refer to the opposing surfaces of the substrate (described below) used to form a foamed, opacifying element according to the present invention. The terms "first outer surface" and "second outer surface" refer to the opposing outer surfaces of a foamed, opacifying element formed according to the present invention.

Uses

The foamable aqueous compositions, foamed aqueous compositions, and functional protective compositions described herein can be used to prepare foamed, opacifying elements that in turn can be useful as radiation ("light") blocking materials or blackout materials for various environments and structures. The foamed, opacifying elements may also exhibit improved sound and heat blocking properties. The foamed, opacifying elements exhibit blackout properties and can optionally have a printable outer surface able to accept ink used in screen printing, gravure printing, inkjet printing, thermal imaging (such as "dye sublimation thermal transfer"), or other imaging processes. Thus, one can provide printable surfaces in such elements so that the printed image on one outer side is generally not observable from the other outer surface.

Dye sublimation thermal transfer printing is a one of the more widely used methods to impart a desired color or color pattern or image to an outer surface (here, the second opposing surface) of a synthetic fabric substrate such as polyester, nylon and acrylic. Dye sublimation thermal transfer printing utilizes thermally responsive inks containing sublimable dyes or colorants that, under the influence of heat sublime or vaporize onto the outer surface of the fabric, penetrate the fibers, and become entrained therein or attached to the textile fiber. Dye sublimation thermal transfer printing processes and materials used therein are known and are described in numerous publications, for example, in U.S. Pat. No. 3,363,557 (Blake), U.S. Pat. No. 3,952,131 (Sideman), U.S. Pat. No. 4,139,343 (Steiner), U.S. Pat. No. 6,036,808 (Shaw-Klein et al.), U.S. Pat. No. 8,628,185 (Hale et al.), U.S. Pat. No. 9,315,682 (Delys et al.), U.S. Pat. No. 4,117,699 (Renaut), U.S. Pat. No. 4,097,230 (Sandhu), U.S. Pat. No. 4,576,610 (Donenfeld), U.S. Pat. No. 5,668,081 (Simpson et al.), and U.S. Pat. No. 7,153,626 (Foster et al.), the disclosures of all of which are incorporated herein by reference.

Foamable Aqueous Compositions

The foamable aqueous compositions described herein can be suitably aerated to provide foamed aqueous compositions, for example to prepare a foamed, opacifying element according to the present invention as described below. In many embodiments, each foamable aqueous composition used in the present invention has five essential components, that is, only five components are needed to obtain the properties of the foamed, opacifying element described herein: (a) porous particles as described below; (b) a binder material, also described below; (c) one or more additives as described below, for example comprising at least one surfactant; (d) water; and (e) an opacifying colorant different from all of the compounds of component (c). This opacifying colorant is chosen to absorb electromagnetic radiation generally in the UV and visible regions of the electromagnetic spectrum, for example, wavelengths of at least 250 nm and up to and including 800 nm or of at least 350 nm and up to and including 700 nm. Optional (non-essential) components that can be included in the aqueous functional composition are also described below.

The foamable aqueous composition generally has at least 35% and up to and including 70% solids, or more particularly at least 40% and up to and including 60% solids.

(a) Porous Particles:

Porous particles used in the present invention containing discrete pores (or compartments or voids) are used in the opacifying layers and they are generally prepared using one or more water-in-oil emulsions in combination with an aqueous suspension process, such as in the Evaporative Limited Coalescence (ELC) process that is known in the art. The details for the preparation of the porous particles are provided, for example, in U.S. Pat. No. 8,110,628 (Nair et al.), U.S. Pat. No. 8,703,834 (Nair), U.S. Pat. No. 7,754,409 (Nair et al.), U.S. Pat. No. 7,887,984 (Nair et al.), U.S. Pat. No. 8,329,783 (Nair et al.), and U.S. Pat. No. 8,252,414 (Putnam et al.), the disclosures of all of which are incorporated herein by reference. Thus, the (a) porous particles are generally polymeric and organic in nature (that is, the continuous polymeric phase is polymeric and organic in nature) and non-porous particles (having less than 5% porosity) are excluded from use in the present invention. Inorganic particles can be present on the outer surface as noted below.

The (a) porous particles are composed of a continuous polymeric phase derived from one or more organic polymers that are chosen so that the continuous polymeric phase has a glass transition temperature ($T_g$) of greater than 80° C., or more typically of at least 100° C. and up to and including 180° C., or more likely at least 110° C. and up to and including 170° C. as determined using Differential Scanning calorimetry. Polymers having a $T_g$ that is greater than 200° C. are typically less useful in the continuous polymeric phase.

In addition, the continuous polymeric phase can comprise one or more organic polymers, each of which has a viscosity of at least 80 centipoises (80 mPa-sec) and up to and including 500 centipoises (500 mPa-sec) at a shear rate of 100 $sec^{-1}$ as measured in ethyl acetate at a concentration of 20 weight % at 25° C. This feature can be important to optimize the preparation of porous particles so that they have a narrow particle size distributions and high porosity.

For example, the continuous polymeric phase can comprise one or more organic polymers having the properties noted above, wherein generally at least 70 weight % and up to and including 100 weight % based on the total polymer weight in the continuous polymeric phase, is composed of one or more cellulose polymers (or cellulosic polymers) including but not limited to, those cellulosic polymers derived from one or more of cellulose acetate, cellulose butyrate, cellulose acetate butyrate, and cellulose acetate propionate. A polymer derived solely from cellulose acetate butyrate is particularly useful. Mixtures of these cellulose polymers can also be used if desired, and mixtures comprising a polymer derived from cellulose acetate butyrate as at least 80 weight % of the total of cellulose polymers (or of all polymers in the continuous polymeric phase) are particularly useful mixtures.

In general, the (a) porous particles used in the present invention have a mode particle size equal to or less than 50 μm, or of at least 2 μm and up to and including 50 μm, or typically of at least 3 μm and up to and including 30 μm or even up to and including 40 μm. Most useful (a) porous particles have a mode particle size of at least 3 μm and up to and including 20 μm. Mode particle size represents the most frequently occurring diameter for spherical particles and the most frequently occurring largest diameter for the non-spherical particles in a particle size distribution histogram, which can be determined using known equipment (including light scattering equipment such as the Sysmex FPIA 3000 Flow Particle Image Analyzer that used image analysis measurements and that can be obtained from various sources including Malvern Panalytical; and coulter counters and other particle characterizing equipment available from Beckman Coulter Diagnostics), software, and procedures.

Pore stabilizing materials such as hydrocolloids can be present within at least part of the volume of the discrete pores distributed throughout the continuous polymeric phase, which pore stabilizing materials are described in the Nair, Nair et al., and Putnam et al. patents cited above. In some embodiments, the same pore stabilizing material is incorporated in essentially all the discrete pores throughout the entire (a) porous particles. The pore stabilizing hydrocolloids can be selected from the group consisting of carboxymethyl cellulose (CMC), a gelatin or gelatin derivative, a protein or protein derivative, polyvinyl alcohol and its derivatives, a hydrophilic synthetic polymer, and a water-soluble microgel.

It can be desired in some embodiments to provide additional stability of one or more discrete pores in the (a) porous particles during their formation, by having one or more amphiphilic block copolymers disposed at the interface of the one or more discrete pores and the continuous polymeric phase. Such materials are "low HLB", meaning that they have an HLB (hydrophilic-lipophilic balance) value as it is calculated using known science, of 6 or less, or even 5 or less. The details of these amphiphilic polymers and their use in the preparation of the (a) porous particles are provided in U.S. Pat. No. 9,029,431 (Nair et al.), the disclosure of which is incorporated herein by reference.

A particularly useful amphiphilic block copolymer useful in such embodiments comprises poly(ethyleneoxide) and poly(caprolactone) that can be represented as PEO-b-PCL. Amphiphilic block copolymers, graft copolymers and random graft copolymers containing similar components are also useful.

Such an amphiphilic block copolymer can be generally present in the (a) porous particles in an amount of at least 1 weight % and up to and including 99.5 weight %, or at least 2 weight % and up to and including 50 weight %, based on total porous particle dry weight.

The (a) porous particles used in this invention can be spherical or non-spherical depending upon the desired use. In a method used to prepare the (a) porous particles, additives (shape control agents) can be incorporated into the first or second aqueous phases, or in the oil (organic) phase to modify the shape, aspect ratio, or morphology of the (a) porous particles. The shape control agents can be added prior to or after forming the water-in-oil-in-water emulsion. In either case, the interface at the oil and second water phase is modified before organic solvent is removed, resulting in a reduction in sphericity of the (a) porous particles. The porous particles can also comprise surface stabilizing agents, such as colloidal silica, on the outer surface of each (a) porous particle, in an amount of at least 0.1 weight %, based on the total dry weight of the (a) porous particle.

The average size of the discrete pores in the (a) porous particles is described above.

The (a) porous particles can be provided as powders, or as aqueous suspensions (including water or water with water-miscible organic solvents such as alcohols). Such powders and aqueous suspensions can also include surfactants or suspending agents to keep the porous particles suspended or for rewetting them in an aqueous medium. A useful surfactant for this purpose, for example, is a $C_{12}$-$C_{14}$ secondary alcohol derivative of poly(ethylene oxide) that can be commercially available as TERGITOL® 15-S-7 (Dow Chemical Corporation). The other compositional features are described in the incorporated description of methods for preparing the (a) porous particles.

The (a) porous particles are generally present in the foamable aqueous composition in an amount of at least 0.05 weight % and up to and including 20 weight %, or typically at least 0.5 weight % and up to and including 15 weight %, based on the total weight of the foamable aqueous composition (including all solvents that are present), particularly when the (a) porous particles have a mode size of at least 3 μm and up to and including 20 μm.

Optimal opacifying layers designed according to the present invention comprise: (a) porous particles containing a small amount of an (e) opacifying colorant as described below to enhance the light blocking capacity of the (a) porous particles (particularly transmitted light blocking capacity); a (b') matrix material derived from a (b) binder material to hold the (a) porous particles in place; and (c) surfactants and other additives including optionally one or more tinting colorants that can be in other (a) porous particles or dispersed within the layer. The foamed aqueous composition used to prepare the opacifying layer comprises foam cells that surround the (a) porous particles.

Upon drying the foamed aqueous composition, the large mismatch in refractive index between the discrete pores of the (a) porous particles in the opacifying layer and the polymer walls (continuous polymeric phase), and the dried foam cells, causes incident electromagnetic radiation passing through the opacifying layer to be scattered by the multiplicity of interfaces and discrete pores. The back scattered electromagnetic radiation can again be scattered and returned in the direction of the incident electromagnetic radiation thus reducing the attenuation and contributing to the opacifying power and brightness or luminous reflectance of the opacifying layer. If a small amount of (e) opacifying colorant is present in the (a) porous particles of the opacifying layer, for example either in the discrete pores or in the continuous polymer phase of the (a) porous particles, the opacifying power of the opacifying layer is increased. This is because the multiple scattering of electromagnetic radiation in the opacifying layer increases the path length of the electromagnetic radiation through the opacifying layer, thereby increasing the chance that the electromagnetic radiation will encounter the opacifying colorant in the opacifying layer and be blocked or absorbed by it.

A single opacifying layer can be present in embodiments according to the present invention comprises (a) porous particles and a relatively low amount of an (e) opacifying colorant such as carbon black for creating light-blocking coatings and the dry foam cells surrounded by the (b') matrix material. Multiple light scattering effects by and among the (a) porous particles and the surrounding dry foam cells, increase the path of the electromagnetic radiation through the opacifying layer. The likelihood of electromagnetic radiation encountering an (e) opacifying colorant is increased by this greater path length.

Some particularly useful (a) porous particles comprise a continuous polymeric phase and a first set of discrete pores dispersed within the continuous polymeric phase, wherein:

each (a) porous particle has a mode particle size of at least 3 µm and up to and including 20 µm;

each (a) porous particle has a porosity of at least 35 volume % and up to and including 65 volume %;

the continuous polymeric phase comprises one or more polymers, at least 70 weight % of which are derived from one or more of cellulose acetate, cellulose butyrate, cellulose acetate butyrate, and cellulose acetate propionate such that the continuous polymeric phase has a glass transition temperature ($T_g$) of at least 110° C. and up to and including 170° C. as determined using Differential Scanning calorimetry;

the average size of the discrete pores is at least 50 nm and up to and including 2,000 nm;

the (a) porous particles further comprise a pore stabilizing hydrocolloid within at least part of the volume of the discrete pores, which pore stabilizing hydrocolloid is selected from the group consisting of carboxymethyl cellulose, a gelatin, a protein or protein derivative, polyvinyl alcohol or a derivative thereof, a hydrophilic synthetic polymer, and a water-soluble microgel; and the (a) porous particles comprise one or more amphiphilic low HLB block copolymers disposed at the interface of one or more of the discrete pores and the continuous polymeric phase.

(b) Binder Materials:

The foamable and foamed aqueous compositions used in the present also comprises one or more (b) binder materials that can behave as a binding matrix for all the materials in such wet compositions, and can form the (b') matrix material to hold the (a) porous particles, (c) additives, and (e) opacifying colorants together in a dry opacifying layer.

It is particularly useful that the (b) binder material have the following properties: it is water-soluble or water-dispersible; it is capable of forming a stable foamed aqueous composition with the essential and optional components described herein; it is capable of being disposed onto a suitable substrate as described below; it does not inhibit the aeration (foaming) process (described below); it is capable of being dried and where desired also crosslinked (or cured); it has good light and heat stability; and it is film-forming but upon curing, it contributes to the flexibility of the foamed, opacifying element and is thus not too brittle, for example having a $T_g$ of less than 25° C. as determined using Differential Scanning Calorimetry.

The choice of (b) binder material can also be used to increase the cleanability of the resulting foamed opacifying compositions in the foamed, opacifying elements. In addition, the (b) binder material can be used to provide a (b') matrix material that adds to a supple feel to touch and flexibility especially when disposed on a porous substrate (for example, a fabric) that is meant for window coverings such as draperies. The (b') matrix material derived from the (b) binder material is useful in the foamed, opacifying element for binding together and adhering the (a) porous particles and other materials in the opacifying layer on the substrate.

The (b) binder material can include one or more organic polymers that are film forming and that can be provided as an emulsion, dispersion, or an aqueous solution, and that cumulatively provide the properties noted above. It can also include polymers that are self-crosslinking or self-curable, or it can include one or more polymers to which crosslinking agents are added and are thus curable or capable of being crosslinked (or cured) under appropriate conditions.

Thus, if the (b) binder material is crosslinkable (or curable) in the presence of a suitable crosslinking agent or catalyst, such crosslinking (or curing) can be activated chemically with heat, radiation, or other known means. A curing or crosslinking process serves to provide improved insolubility of the resulting dry foamed composition and well as cohesive strength and adhesion to the porous substrate. The curing or crosslinking agent is generally a chemical having functional groups capable of reacting with reactive sites in a (b) binder material (such as a functionalized latex polymer) under curing conditions to thereby produce a crosslinked structure. Representative crosslinking agents include but are not limited to, multi-functional aziridines, aldehydes, methylol derivatives, and epoxides.

Useful (b) binder materials include but are not limited, to poly(vinyl alcohol), poly(vinyl pyrrolidone), ethylene oxide polymers, polyurethanes, urethane-acrylic copolymers, other acrylic polymers, styrene polymers, styrene-acrylic copolymers, vinyl polymers, vinyl-acrylic polymers, styrene-butadiene copolymers, acrylonitrile copolymers, polyesters, silicone polymers, or a combination of two or more of these organic polymers. Such binder materials are readily available from various commercial sources or can be prepared using known starting materials and synthetic conditions. The binder material can be anionic, cationic or nonionic in net charge. A useful class of film-forming (b) binder materials includes aqueous latex polymer dispersions such as acrylic latexes (including acrylic copolymers) that can be ionic or nonionic colloidal dispersions of acrylate polymers and copolymers. For example, useful film-forming aqueous latexes include but are not limited to, styrene-butadiene latexes, poly(vinyl chloride) and poly(vinylidene chloride)

latexes, poly(vinyl pyridine) latexes, poly(acrylonitrile) latexes, poly(vinyl chloride)-acrylic copolymers, and latexes formed from N-methylol acrylamide, butyl acrylate, and ethyl acrylate. Examples of suitable commercially available (b) binder materials include those sold by DSM under the trade names NEOREZ® A-1150, NEOCRYL® A-6093, by Dow under the trade name RHOPLEX® NW-1845K and by BASF under the tradenames BUTOFAN® N S144, and BUTOFAN® NS 222, by Lubrizol under the tradenames HYSTRETCH® and HYCAR®, and resins sold by Royal Adhesives such as PARANOL® AC-2032. Another useful (b) binder material is comprised of a poly(vinyl chloride-acrylic monomer) copolymer that is sold by Lubrizol under the trade name VYCAR®.

The (b) binder material generally has a glass transition temperature that is less than 25° C., more likely equal to or less than −10° C., or even equal to or less than −25° C. Glass transition temperature for these materials can be determined using known procedures such as Differential Scanning calorimetry as described above. The (b) binder material desirably has adequate flexibility and tensile strength in order to maintain integrity upon handling.

The one or more (b) binder materials can be present in the foamable aqueous composition in an amount of at least 15 weight %, or at least 20 weight % and up to and including 70 weight %, or typically at least 30 weight % and up to and including 50 weight %, based on the total foamable aqueous composition (that is, the total weight of all components including all solvents).

(c) Additives:

The foamable aqueous compositions can include at least 0.0001, or at least 0.001 weight %, or even at least 0.01 weight %, and up to and including 2 weight %, or up to and including 5 weight %, or even up to and including 20 weight %, or even at least and including 30 weight % of one or more (c) additives, and typically such (c) additives can comprise at least one surfactant as defined below. These amounts refer to the total of all the one or more (c) additives in each foamable aqueous composition and are based on the total weight of those compositions (including water). There can be mixtures of each type of (c) additive, or mixtures of two or more types of (c) additives in each of the foamable aqueous compositions.

Any of these (c) additives or mixtures thereof, can be present within any location of the foamed aqueous composition, including but not limited to: the continuous polymeric phase; a volume of the first set (or other set) of discrete pores; or both the first set (or other set) of discrete pores and the continuous polymeric phase of the (a) porous particles. Alternatively, the one or more (c) additives can be present within the (b) binder material alone, or both within the (b) binder material and within the (a) porous particles.

In all embodiments, the (c) additives useful in the present invention are not the same compounds or have the same function as the (a) porous particles, (b) binder materials, and (e) opacifying colorants as described herein.

Useful (c) additives include but are not limited to plasticizers, inorganic or organic pigments and dyes (for example, pigment or dye colorants different from the opacifying colorants described below), flame retardants, biocides (such as fungicides and antimicrobial agents), preservatives, pH buffers, optical brighteners, tinting colorants, metal particles such as metal platelets or metal flakes, thickeners, and inert inorganic or organic fillers (such as clays) that are not any of the other materials or opacifying colorants described below.

The "inert" inorganic or organic fillers are particles that can be added to reduce the use of more expensive (b) binder materials. Such fillers do not undergo a chemical reaction in the presence of water or other components in the foamable aqueous composition; nor do they absorb significant electromagnetic radiation like the (e) opacifying colorants. Useful inert organic or inorganic filler materials include but are not limited to titanium dioxide, talc, clay (for example, kaolin), magnesium hydroxides, aluminum hydroxides, dolomite, glass beads, silica, mica, glass fibers, nano-fillers, and calcium carbonate. Combinations of these materials can be used if desired. A clay, talc, calcium carbonate, or a mixture of any of these materials is particularly useful.

One or more plasticizers can be added to soften the "hand" of the final foamed, opacifying element. Useful plasticizers include but are not limited to, alkyl sulfonic acid of phenol sold under the name MESSAMOL® (Lanxess Chemical, Inc.) and bis(2-ethylhexyl) terephthalate sold under the name EASTMAN® 168 (Eastman Chemical Co.).

As noted above, at least one (c) additive can be a surfactant that is defined as a compound that reduces surface tension. In most embodiments, this surfactant is a foaming agent that functions to create and enhance foam formation. In many embodiments, the one or more (c) additives comprise one or more foaming agents (surfactants) as well as one or more foam stabilizing agents that are also surface-active agents that function to structure and stabilize the foam. Examples of useful foaming agents (surfactants) and foam stabilizing dispersing agents include but are not limited to, ammonium stearate, sodium lauryl sulfate, ammonium lauryl sulfate, ammonium sulfosuccinate, disodium stearyl sulfosuccinate, diammonium n-octadecyl sulfosuccinamate, ethoxylated alcohols, ionic, nonionic or anionic agents such as fatty acid soaps or a fatty acid condensation product with an alkylene oxide, for example, the condensation product of ethylene oxide with lauryl or oleic acid or an ester of fatty alcohols and similar materials, many of which can be obtained from various commercial sources. Mixtures of foaming agents can be used if desired.

The relative amounts of each of these two types of (c) additives is not critical if the desired function is evident, that is suitable foaming properties as required to prepare the foamed aqueous composition, and stability of the foamed aqueous composition during storage and manufacture of the foamed, opacifying elements. The optimal amounts of each of these (c) additives can be determined by using routine experimentation.

Other useful (c) additives include metal particles that can be obtained from any available commercial source as metal flakes or metal platelets and in dry form or as a suspension. Such metal flakes or metal platelets are substantially 2-dimensional particles, having opposing surfaces or faces separated by a relatively minor thickness dimension. The metal flakes can have a size range of at least 2 μm and up to and including 50 μm in main surface equivalent circular diameter (ECD) wherein the ECD is the diameter of a circle having the same area as the main face. Examples of useable metal flakes include those available from Ciba Specialty Chemicals (BASF) such as aluminum flakes that are available as METASHEEN 91-0410 in ethyl acetate, and copper flakes that can be obtained from various commercial sources. Further details of useful metal flakes are provided in Cols. 11-12 of U.S. Pat. No. 8,614,039 (Nair et al.), the disclosure of which is incorporated herein by reference. The metal particles described above, and particularly the metal flakes, can be in the foamable aqueous composition in any suitable location but they are particularly useful when incorporated within the (a) porous particles such as within the volume of the discrete pores of the (a) porous particles.

Useful biocides (that is, antimicrobial agents or antifungal agents) that can be present as (c) additives include but are not limited to, silver metal (for example, silver particles, platelets, or fibrous strands) and silver-containing compounds such as silver chelates and silver salts such as silver sulfate, silver nitrate, silver chloride, silver bromide, silver iodide, silver iodate, silver bromate, silver tungstate, silver phosphate, and silver carboxylates. In addition, copper metal (for example, copper particles, platelets, or fibrous strands) and copper-containing compounds such as copper chelates and copper salts can be present as (c) additives for biocidal purposes. Mixtures of any of silver metal, silver-containing compounds, copper metal, and copper-containing compounds, can also be present and used in this manner.

It can also be useful to include thickeners as (c) additives to modify the viscosity of the foamable aqueous composition and to stabilize it if aeration is not inhibited. A skilled worker can optimize the viscosity to obtain optimal aeration conditions and desired foam density as described below. Useful thickeners can be utilized to control the rheology of the foamable aqueous composition depending upon the method used to form the dry opacifying layer on a substrate as described below. Particularly useful rheology modifiers are RHEOVIS® PU 1214 (BASF), ACRYSOL® G111 (Dow Chemical Company), and Paragum (Royal Adhesives, Inc.).

Useful (c) additives can comprise one or more tinting colorants that can be suitable dyes or pigments (or combinations) and can be used to provide a specific observable color, coloration, or hue in the resulting foamed, opacifying elements. These materials are not chosen to provide the opacifying property described below for the (e) opacifying colorants and thus, tinting colorants are intended to be different materials than the (e) opacifying colorants. Mixtures of tinting colorants can be present in the foamable aqueous compositions and they can be different in composition and amount from each other. The desired coloration or hue can be obtained using specific tinting colorants can be used in combination with (e) opacifying colorant(s) described below to offset or modify the original color of a foamed, opacifying element (without such materials) to provide more whiteness (or brightness or increased L*) in the final "color" (or coloration). The one or more tinting colorants can be incorporated within the (a) porous particles (either within the volume of discrete pores, within the continuous polymeric phase, or in both places) or they can be uniformly dispersed within the (b) binder material. In some embodiments, a tinting colorant can be incorporated within the same (a) porous particles that also include an (e) opacifying colorant (as described below). Alternatively, one or more tinting colorants can be present within both the (a) porous particles (in a suitable location) and within the (b) binder material.

The one or more tinting colorants can be present in the foamable aqueous composition in an amount of at least 0.0001 weight %, or more typically at least 0.001 weight % and up to and including 3 weight %, based on the total weight of the foamable aqueous composition (including all solvents). Tinting colorants can be dyes or organic pigments that are soluble or dispersible in organic solvents and polymers that are used for making the (a) porous particles and thus can be included within the oil phase used to prepare such (a) porous particles. Alternatively, the tinting colorants can be primarily water-soluble or water-dispersible materials that are included into an aqueous phase used to prepare the (a) porous particles or they can be added directly to the foamable aqueous composition.

It can also be useful to include one or more optical brighteners as (c) additives to increase the whiteness (brightness, L*, or "fluorescent" effect) of the final coloration in the foamed, opacifying element. Optical brighteners are sometimes known in the art as "fluorescent whiteners" or "fluorescent brighteners." In general, such materials are organic compounds selected from classes of known compounds such as derivatives of stilbene and 4,4'-diaminostilbene (such as bistriazinyl derivative); derivatives of benzene and biphenyl (such as styril derivatives); pyrazolines; derivatives of bis (benzoxazole-2-yl); coumarins; carbostyrils; naphthalimides; s-triazines; and pyridotriazoles. Specific examples of optical brighteners can be found in various publications including "Fluorescent Whitening Agents," Kirk-Othmer *Encyclopedia of Chemical Technology, Fourth Edition*, volume 11, Wiley & Sons, 1994. One of more of such compounds can be present in an amount of at least 0.01 weight % and up to and including 2 weight %, all based on the total weight of the foamable aqueous composition.

When present, one or more optical brighteners can be in one or more locations in the foamed aqueous composition. For example, an optical brightener can be present in the (b) binder material, or within the continuous polymeric phase of the (a) porous particles; a volume of the first set (or any other set) of discrete pores in the (a) porous particles; or both in a volume of the first set (or any other set) of discrete pores and the continuous polymeric phase, of the (a) porous particles.

The (c) additives can comprise two or more materials selected from surfactant that is a foaming agent, a foam stabilizing agent, a tinting agent, an optical brightener, a flame retardant, an antimicrobial agent, and an inorganic filler (such as a clay or titanium dioxide).

(d) Aqueous Medium:

Water is the primary solvent used in an (d) aqueous medium in the foamable aqueous compositions according to the present invention. By "primary" is meant that of the total weight of solvents, water comprises at least 75 weight %, and more likely at least 80 weight % and up to and including 100 weight % of the total solvent weight. Auxiliary solvents that can be present must not adversely affect or harm the other components in the composition, namely the (a) porous particles, (b) binder materials, (c) one or more additives, and (e) opacifying agents. Nor must such auxiliary solvents adversely affect formation of the foamable aqueous composition or its use to prepare a foamed, opacifying element. Such auxiliary solvents can be water-miscible organic solvents such as alcohols and ketones.

The (d) aqueous medium then, which is primarily water, comprises at least 30 weight % and up to and including 65 weight %, or typically at least 40 weight % and up to and including 60 weight %, of the total weight of the foamable aqueous composition.

(e) Opacifying Colorants:

The (e) opacifying colorants used in the present invention can be a single material or chosen from any suitable combination of materials such that the single or multiple materials absorb UV and visible electromagnetic radiation (defined above) to provide blackout properties (or suitable opacity). (e) Opacifying colorants can be soluble dyes or pigments or combinations of each or both types of materials. The (e) opacifying colorants are different compositional and functionally from the compounds defined above as the (c) additives.

In most embodiments, the one or more (e) opacifying colorants are present within a volume of the first set (or another set) of discrete pores within the (a) porous particles, within the continuous polymeric binder of the (a) porous particles, or within both the volume of the first set (or another set) of discrete pores and the continuous polymeric binder of the (a) porous particles. This is highly advantageous as the (a) porous particles can be used to "encapsulate" various (e) opacifying colorants as well as tinting colorants or other (c) additives so they are kept isolated from the other components of the foamable aqueous composition and are additionally not exposed to the environment during sewing or upon surface damage of the foamed, opacifying element. However, in some embodiments, it can be useful to incorporate (e) opacifying colorants solely or additionally within the (b) binder material in which the (a) porous particles are dispersed.

As used herein, an (e) opacifying colorant can include one or more colorant materials that are chosen, individually or in combination, to provide the blocking or absorption of electromagnetic radiation (as described above). While the (e) opacifying colorant(s) can provide some coloration or desired hue, they are not purposely chosen for that purpose and are thus materials that are chosen to be different from the tinting colorants described above.

Examples of (e) opacifying colorants that can be used individually or in combination include but are not limited to, neutral or black pigments or dyes, a carbon black, black iron oxide, graphite, aniline black, anthraquinone black, and combinations of colored pigments or dyes such as combinations of two or more cyan, magenta, green, orange, blue, red, and violet dyes. The present invention is not limited to only the specific opacifying colorants described herein but these are considered as representative and as suitable guidance for a skilled worker to choose other opacifying colorants for the desired purpose. A carbon black, a neutral or black pigment or dye (or combination thereof), or a combination of pigments or dyes other than carbon black, is particularly useful as an opacifying colorant, of which there are many types available from commercial sources. Combinations of dyes or pigments such as a combination of the subtractive primary colored pigments (cyan, magenta, and yellow colored pigments) can also be used to provide a visually neutral (e) opacifying colorant.

The (e) opacifying colorant can be generally present in the foamable aqueous composition in an amount of at least 0.001 weight % and up to and including 0.5 weight %, or even at least 0.003 weight % and up to and including 0.2 weight %, all based on the total weight of the foamable aqueous composition (including the weight of all solvents). These amounts refer to the total amount of one or a mixture of (e) opacifying colorants.

In some embodiments, the (e) opacifying colorant is a carbon black that is present in an amount of at least 0.003 weight % and up to and including 0.2 weight %, based on the total weight of the foamable aqueous composition.

If the (e) opacifying colorants are in pigment form, they can be milled to a fine particle size and then encapsulated within the volume of the discrete pores of the (a) porous particles by incorporating the milled pigment within an aqueous phase used in making the (a) porous particles. Preparation of milled solid particle dispersions can include combining the (e) opacifying colorant particles to be reduced in size with a dispersant and a liquid medium such as water or ethyl acetate [when the (e) opacifying colorant is incorporated in the continuous polymeric phase] in which the (a) porous particles are to be dispersed, in a suitable grinding mill in which the (a) porous particles are reduced in size and dispersed. The dispersant, an important ingredient in the milling, can be chosen to allow the (e) opacifying colorant particles to be milled in the liquid medium down to a size small enough for incorporation into the discrete pores of the porous particles. The dispersants can be selected to obtain efficient (e) opacifying colorant particle size reduction during milling, provide good colloidal stability of the (e) opacifying colorant particles to prevent agglomeration after milling and impart the desired properties of the final foamed aqueous composition containing the (e) opacifying colorants and the (a) porous particles containing them.

Alternatively, the (e) opacifying colorant can be incorporated within the continuous polymeric phase of the (a) porous particles by incorporating the (e) opacifying colorant in the oil phase used in making the porous particles. Such arrangements can be achieved during the manufacture of the (a) porous particles using the teaching provided herein and in references cited herein.

Foamed Aqueous Compositions

Foamed aqueous compositions can be prepared using the procedures described below wherein an inert gas (such as air) is mechanically incorporated into the foamable aqueous composition as described above, which procedures are designed to provide a foam density of at least 0.1 g/cm² and up to and including 0.5 g/cm³, or more likely of at least 0.15 g/cm³ and up to and including 0.4 g/cm³. Foam density can be determined gravimetrically by weighing a known volume of the foamed aqueous composition.

The resulting foamed aqueous composition according to this invention generally has at least 35% solids and up to and including 70% solids, or more particularly at least 40% solids and up to and including 60% solids.

Components (a) through (e) of the foamed aqueous composition are generally present in the same amounts as described for the foamable aqueous composition (described above) as the foaming process does not appreciably add to or diminish the amounts of such components.

For example, the (a) porous particles (as described above) can be present in the foamed aqueous composition in an amount of at least 0.05 weight % and up to and including 15 weight %, or typically of at least 0.5 weight % and up to and including 10 weight %, based on the total weight of the foamed aqueous composition (including all solvents).

One or more (b) binder materials (as described above) can be present in an amount of at least 15 weight %, or at least 20 weight % and up to and including 70 weight % or typically of at least 30 weight % and up to and including 50 weight %, based on the total weight of the foamed aqueous composition (including all solvents).

One or more (c) additives (as described above) can be present in an amount of at least 0.0001 weight % and up to and including 30 weight % or typically of at least 0.001 weight %, or even at least 0.01 weight %, and up to and including 20 weight %, based on the total weight of the foamed aqueous composition (including all solvents). At least one of the (c) additives can be a surfactant as described above, and the (c) additives can comprise a foaming agent and a foam stabilizing agent. In some particularly useful embodiments of the foamed aqueous composition, the (c) additives comprise two or more materials selected from surfactant that is a foaming agent, a surfactant that is a foam dispersing agent, a tinting agent, an optical brightener, a flame retardant, an antimicrobial agent, and an inert organic or inorganic filler (such as a clay and titanium dioxide).

Water can also be present as the predominant solvent (at least 75 weight % of total solvent weight), and all the solvents in an (d) aqueous medium can be present in an amount of at least 30 weight % and up to and including 70 weight %, or typically at least 40 weight % and up to and including 60 weight %, based on the total weight of the foamed aqueous composition.

The (e) opacifying colorants (as described above) are generally present in any suitable amount to provide the desired appearance, coloration, and opacity in the resulting foamed, opacifying element, In many embodiments, the one or more (e) opacifying colorants can be present in an amount of at least 0.001 weight % or at least 0.001 weight % and up to and including 0.5 weight %, or even in an amount of least 0.003 weight % and up to and including 0.2 weight %, especially when the (e) opacifying colorant is a carbon black, all weights based on the total weight of the foamed aqueous composition (including all solvents).

For example, a opacifying colorant can be a carbon black and present in an amount of at least 0.003 weight % and up to and including 0.2 weight % based on the total weight of the foamed aqueous composition. Such (e) opacifying colorant can be present in any desirable location as noted above.

Foamed, Opacifying Elements

Foamed, opacifying elements can be prepared using methods described below according to the present invention. Such articles comprise a substrate, an opacifying layer formed on the first opposing surface in a manner described below, and a functional composition disposed over (or directly on in some embodiments) the opacifying layer, for example as a functional layer, as described below. Each substrate useful herein generally has two opposing sides, for example, a first opposing surface (or side) and a second opposing surface (or side), which opposing surfaces are generally planar in form.

In some embodiments, the foamed, opacifying elements according to this invention can be designed with a single opacifying layer disposed directly on one (such as the first) opposing surface of the substrate.

However, some foamed, opacifying elements can be designed with multiple layers including a single opacifying layer. A multiple-layer structure can for example, comprise at least one opacifying layer sandwiched between foamed non-opacifying layers, or an opacifying layer disposed directly on a substrate with a foamed non-opacifying layer disposed directly on the opacifying layer, or a non-opacifying layer disposed directly on a substrate and an opacifying layer disposed directly on the non-opacifying layer.

The opacifying layer can be derived from a foamed aqueous composition described above, and comprises components (a) porous particles, (b') matrix material derived from (b) binder material, (c) one or more additives, (d) aqueous medium, and (e) opacifying colorant, all of which are described in more detail above.

Component (a) porous particles that are present in an amount of at least 0.1 weight % and up to and including 40 weight % or at least 0.5 weight % and up to and including 20 weight % are described in detail above, the amounts based on the total weight of the opacifying layer. The (a) porous particles can have a mode particle size of at least 2 µm and up to and including 50 µm (or at least 3 µm and up to and including 30 µm, or more likely at least 3 µm and up to and including 20 µm) and a first set of discrete pores of the (a) porous particles can have an average pore size of at least 100 nm and up to and including 7,000 nm.

In addition, the opacifying layer includes a (b') matrix material that is derived from a (b) binder material upon curing, which (b') matrix material is generally present in an amount of at least 10 weight % and up to and including 80 weight %, or at least 20 weight % and up to and including 60 weight %, based on the total weight of the opacifying layer. Such (b') matrix materials are at least partially cured or crosslinked as described below, and can be cured up to 100% of all potential curable or crosslinking sites in the (b) binder material.

One or more (c) additives can be present in an amount of at least 0.0001 weight % and up to and including 50 weight %, or at least 1 weight % and up to and including 45 weight %, such (c) additives being selected from the group consisting of foaming agents, foam stabilizing agents, dispersants, plasticizers, inorganic or organic pigments and dyes (for example, pigment or dye colorants different from the opacifying colorants described below), flame retardants, biocides (including antimicrobials and fungicides), preservatives, pH buffers, optical brighteners, tinting colorants, metal particles such as metal platelets or metal flakes, thickeners, and inert inorganic or organic fillers (such as clays and titanium dioxide) that are not any of the other materials or (e) opacifying colorants described herein, all of which (c) additives are described in more detail above. The amounts are based on the total weight of the opacifying layer. As noted above, embodiments can include at least one surfactant that is a foaming agent and at least one foam stabilizing agent.

Particularly useful (c) additives can comprise one or more materials selected from a foaming agent, a foam stabilizing agent, a tinting colorant, an optical brightener, a flame retardant, a biocide (such as an antimicrobial agent), and inert inorganic or organic fillers (such as a clay and titanium dioxide). A useful biocide can comprise silver metal or a silver salt.

The opacifying layer can comprise one or more tinting colorants as (c) additives, for example in the (a) porous particles, in an amount of at least 0.0001 weight % and up to and including 3 weight %, based on the total weight of the opacifying layer.

It is also useful to include one or more optical brighteners as (c) additives in an amount of at least 0.001 weight % and up to and including 0.4 weight %, based on the total weight of the opacifying layer.

Unless otherwise noted, the term "opacifying layer" used herein refers to a foamed and densified (and optionally cured) layer substantially in dry form, that contains less than 5 weight %, or even less than 2 weight %, of aqueous medium (including water and any auxiliary solvents), based on the total weight of the dry foamed composition. This amount does not include any water that may be present in the discrete pores of the (a) porous particles. The opacifying layer generally comprises at least 90% solids, or at least 95% or 98% solids.

The opacifying layer can also contain at least 0.002 weight %, or even at least 0.02 weight % and up to and including 2 weight % or up to and including 1 weight %, of one or more (e) opacifying colorants (as described above), based on the total weight of the opacifying layer. Such (e) opacifying colorants can be present in locations described above. As noted above, the (e) opacifying colorants are different in composition and function from all other materials in the opacifying layer. The possible locations of the (e) opacifying colorant are described above.

For example, a carbon black can be present as the (e) opacifying colorant in an amount of at least 0.002 weight % and up to and including 1 weight %, based on the total weight of the opacifying layer.

The foamed, opacifying elements are designed particularly to exhibit an optical density (OD) of at least 4 or more likely at least 5. The OD value can be determined as described herein.

Substrates useful in the practice of the present invention can comprise various porous or non-porous materials including but not limited to woven and nonwoven textile fabrics composed of nylon, polyester, cotton, aramide, rayon, polyolefin, acrylic wool, porous glasses, fiberglass fabrics, or felt or mixtures thereof, or porous polymeric films [such as porous films derived from triacetyl cellulose, polyethylene terephthalate (PET), diacetyl cellulose, acetate butyrate cellulose, acetate propionate cellulose, polyether sulfone, polyacrylic based resin, for example, poly(methyl methacrylate), a polyurethane-based resin, polyester, polycarbonate, aromatic polyamide, polyolefins (for example, polyethylene and polypropylene), polymers derived from vinyl chloride (for example, polyvinyl chloride and a vinyl chloride/vinyl acetate copolymer), polyvinyl alcohol, polysulfone, polyether, polynorbornene, polymethylpentene, polyether ketone, (meth)acrylonitrile], porous paper or other porous cellulosic materials, canvases, porous wood, porous plaster and other porous materials that would be apparent to one skilled in the art. The substrates can vary in dry thickness and in many embodiments, the substrate thickness is at least 50 μm.

Some useful substrates comprise a porous fabric comprising a plurality (at least two) continuous yarn strands woven or knitted together. As used herein, the "yarn" comprises continuous strands (at least two) of a material, which strands are twisted or woven together to form a "thread." Each yarn strand comprises a multifilament core that is encased in a coating comprising a thermoplastic polymer.

The multifilament core can comprise multiple (at least two) filaments composed of naturally-occurring fibers or polymers, or composed of synthetic polymers selected from the group consisting of an aramid, a polypropylene, a polyethylene, an acrylic resin, nylon, and a polyester. Alternatively, the multifilament core can comprise fiberglass as multiple filaments. Each of the multiple filaments can be composed of the same material or a mixture of such materials. Alternatively, the multiple filaments can be homogenous, but filaments composed of different materials can be used in the same multifilament core.

The multifilament core can be designed to have any desirable size and in general, it has an average diameter of at least 75 denier and up to and including 2500 denier, wherein a denier refers to 1.2 g/9000 meters of a filament.

Each filament of the multifilament core can further comprise a flame retardant, examples of which would be readily apparent to one skilled in the art. A multifilament core can be prepared using known technology, for example as described in U.S. Patent Application Publication 2007/0015426 (Ahmed et al.), the disclosure of which is incorporated herein by reference.

The coating applied to the multifilament core can comprise one or more thermoplastic polymers, including but not limited to a polyester elastomer, a polypropylene, a polyethylene, an ethylene octane copolymer, a substituted or unsubstituted vinyl chloride polymer (including homopolymer and copolymers derived in part from vinyl chloride), polyvinylidene fluoride, ethylene vinyl acetate, a thermoplastic polyurethane, poly(tetrafluoroethylene) (PTFE), a silicone resin, and various hot melt adhesives. Various grades or combinations of these materials can be used if desired. The term "thermoplastic" refers to a polymeric material or resin that changes properties when heated and cooled.

Besides the thermoplastic polymer, the coating can further comprise a colorant (such as one or more pigments or dyes), a flame retardant, an antimicrobial agent, an inert inorganic pigment, a thermoplastic resin, a polyurethane, an ethylene vinyl acetate copolymer, or any combination of these materials. Examples of useful additives to the coating would be readily apparent to one skilled in the art and some representative materials are described in U.S. Patent Application Publication 2007/0015426 (noted above).

Desired coatings for application to the multifilament core can be formulated and applied using procedures and yarn manufacturing equipment that are known in the art, including those described in U.S. Patent Application Publication 2007/0015426 (noted above).

Each continuous yarn strand can generally have an average diameter of at least 0.15 mm, and it can be at least 0.2 mm and up to and including 1.5 mm, or at least 0.2 mm and up to and including 1 mm, in length, wherein "average" is determined from at least 5 measurements along the same strand. Each strand can have a uniform or non-uniform cross-sectional area.

Substrates useful in this invention generally have an openness (or Openness Factor) of 0% and up to and including 10%, or at least 1% and up to and including 10%, or of at least 5% and up to and including 10%.

The substrates can be surface treated before application of the aqueous foamed composition by various processes including corona discharge, glow discharge, UV or ozone exposure, flame, or solvent washing in order to promote desired adhesion and other physical properties.

Functional Composition Formulations

A functional composition according to this invention is intended to provide the foamed, opacifying elements with one or more functional properties described below. A functional composition can comprise (i) inorganic or organic spacer particles (described below) as the sole essential component. However, in some embodiments containing the (i) inorganic or organic spacer particles, a (ii) solid lubricant (described below) can be also present. In still other embodiments, a (ii) solid lubricant and a (iii) tinting material (described below) can be present together with the (i) inorganic or organic spacer particles. In still other embodiments, (i) inorganic or organic spacer particles can be combined with a (iii) tinting material, but a (ii) solid lubricant is not present.

In additional embodiments according to this invention, the functional composition can comprise the (iii) tinting material as the sole essential component but the presence of the (i) inorganic or organic spacer particles is highly recommended, and a (ii) solid lubricant can also be present if desired.

Before application, each functional composition formulation used in the practice of this invention can comprise an aqueous dispersion of the desired components. For example, in some particularly useful embodiments, the functional composition formulation, depending on its function, can comprise: (i) inorganic or organic spacer particles, a (ii) solid lubricant, and a (iii) tinting material along with a (iv) organic polymeric binder, a (v) crosslinking agent for the (iv) organic polymeric binder, if needed, an optional thickener and a coating aid including but not limited to a wetting surfactant (having a hydrophilic-lipophilic balance number of at least 7), all mixed together in water to form a stable aqueous dispersion.

In other embodiments, the functional composition formulation can include a (iii) tinting material, a (iv) organic polymeric binder, a (v) crosslinking agent for the (iv) organic polymeric binder, if needed, and a coating aid, all mixed together in water to form a stable aqueous dispersion. Such functional composition formulations can optionally include one or both of (i) inorganic or organic spacer particles and a (ii) solid lubricant.

As described below, a functional composition can be disposed over (for example, directly on) the opacifying layer in a uniform continuous manner as a functional layer. In other embodiments, the functional composition can be disposed on the opacifying layer in a discontinuous manner, in small or large regions, for example, from spraying to form a regular or irregular pattern. Alternatively, regions of functional composition can merely can be provided in another manner. In many embodiments, the functional composition can be disposed directly on the opacifying layer in a uniform or discontinuous manner.

In some embodiments, the functional composition formulation can be foamed similarly to foaming of the foamable aqueous composition described below before it is disposed over (or directly on) the opacifying layer. The resulting functional composition is then also foamed.

The functional composition can be present at a dry coverage of at least 0.1 g/m$^2$ and up to and including 50 g/m$^2$ or of at least 5 g/m$^2$ and up to and including 25 g/m$^2$.

A functional composition can provide one or more functions simultaneously. For example, it can provide one or more of: a "release" function where the coefficient of friction between the opacifying layer and any other solid surface is reduced allowing easy separation of the contacting surfaces; an anti-blocking function where microscopic protrusions or asperities help to minimize surface contact between the opacifying layer and any other solid surface by increasing the distance between the two contacting surfaces, thereby minimizing blocking; antimicrobial function (with one or more antimicrobial agents present); tactile function where the functional composition enhances the tactile experience (or "feel") of the opacifying layer; antistatic function to reduce static charge; and a soil resistance function to reduce potential soiling. These functional properties can be provided by one or more described components (i), (ii), (iii), (iv), and (v) in the functional composition, and some components can provide multiple functions.

Useful (i) inorganic or organic spacer particles generally have a mode particle size of at least 1 µm, or at least 2 µm and up to and including 100 µm, or up to and including 30 µm, or even at least 2 µm and up to and including 20 µm. Mode particle size can be determined as described above for the definition of the sizes of (a) porous particles.

In addition, these (i) inorganic or organic spacer particles are capable of resisting melt flow at pressures up to and including 100 psi (689.5 kPa) and temperatures up to and including 220° C. This feature enables release of the opacifying layer from hot surfaces such as for example, a blanket belt used during dye sublimation thermal transfer printing process, and preventing unwanted blanket belt contamination by (b') matrix materials derived from (b) binder materials having a glass transition temperature of less than 25° C., which are present in the opacifying layer.

Useful (i) inorganic or organic spacer particles can comprise natural or synthetic silica; talc; clay; mica; calcium carbonate; nylon; a polytetrafluoroethylene, a crosslinked silicone based organic polymer, a poly(alkylsilylsesquioxane); a crosslinked styrenic polymer or copolymer; a crosslinked acrylate or methacrylate polymer or copolymer; a crosslinked acrylamide or methacrylamide polymer or copolymer; a crosslinked allylic polymer or copolymer; or a combination of two or more of these materials. Such materials can be obtained from various commercial sources, or prepared using known procedures and starting materials.

The (i) inorganic or organic spacer particles can be present in the functional composition at a dry coverage of at least 0.001 g/m$^2$ and up to and including 30 g/m$^2$, or at least 1 g/m$^2$ and up to and including 20 g/m$^2$.

A (ii) solid lubricant can be present in non-liquid (or solid) form and generally has a crystallinity of at least 50% and melts very little at temperatures below 40° C. Its wax melt viscosity can be at least 5 centipoise (5 mPa-sec), or at least 10 centipoise (10 mPa-sec) and up to and including 100 centipoise (100 mPa-sec). Mixtures of the same or different types of materials can be used if desired. For example, such (ii) solid lubricants can be selected from one or more components of the group consisting of nonliquid waxes, metal esters of fatty acids such as calcium soaps, graphite, silicone-based polymers, and fluoropolymers, or a combination of any of these materials. The (ii) solid lubricants are different compositionally from the (i) inorganic or organic particles described above.

Useful nonliquid waxes include but are not limited to, polyolefins such as polyethylene wax and polypropylene wax as well as long chain hydrocarbon waxes such paraffin wax. Other useful nonliquid waxes include carbonyl group-containing waxes such as long-chain aliphatic ester waxes; polyalkanoic acid ester waxes such as montan wax, trimethylolpropane tribehenate, and glycerin tribehenate; polyalkanol ester waxes such as tristearyl trimellitate, and distearyl maleate; and polyalkanoic acid amide waxes such as trimellitic acid tristearyl amide. Examples of useful aliphatic amides and aliphatic acids include oleamide, eucamide, stearamide, behenamide, ethylene bi)oleamide), ethylene bis (stearamide), ethylene bis(behenamide), and long chain acids include but are not limited to, stearic, lauric, montanic, behenic, oleic, and tall oil acids. U.S. Patent Application Publication 2010/0021838 (Putnam et al.) describes some representative nonliquid waxes in [0054], the disclosure of which is incorporated herein by reference. Useful materials can be obtained from various commercial sources.

Useful metal esters of fatty acids include but are not limited to, compounds of metals complexed with fatty acids that are derived from vegetable oils or animal tallow, such as sodium, potassium, calcium, magnesium and aluminum soaps, wherein the fatty acids comprise at least 12 and up to and including 20 carbon atoms, and are generally saturated or mono-unsaturated in nature. Representative compounds of this type, such as calcium stearate, can be obtained from various commercial sources.

Graphite can be provided in various forms and obtained from commercial sources.

Useful silicone-based polymers include but are not limited to, polydimethylsiloxanes of varying molecular weights, for example those having a molecular weight less than 10,000.

A useful fluoropolymer is polytetrafluoroethylene (PTFE or Teflon) but other polymers comprising at least some fluorinated moieties can also be used if they have lubricating properties.

A (ii) solid lubricant described herein can be present in the functional composition at a dry coverage of at least 0.01 g/m$^2$ and up to and including 30 g/m$^2$ or at least 1 g/m$^2$ and up to and including 20 g/m$^2$.

The (iii) tinting materials can be one or more pigments, one or more dyes, or any combination thereof. For example, the (iii) tinting material can be used to provide a ΔE 2000 value of at least 3.5, and more likely of at least 4 relative to the a foamed, opacifying element from which the functional composition has been omitted (not applied). By "same," it is meant that all components and structures of the two foamed, opacifying element are identical as best they can be made so, but one foamed, opacifying element contains a functional composition and the other does not.

In some embodiments, one or more white pigments as (iii) tinting materials can be present to provide a "whiter" appearance in the foamed, opacifying element, that is providing an L* value greater than 70 (or even greater than 80). Useful white pigments useful for this purpose include but are not limited to titanium dioxide, barium sulfate, calcium carbonate, and combinations of two or more of such materials.

Other useful (iii) tinting materials can comprise cyan, magenta, yellow, red, green, or blue pigments, or combinations two or more thereof, that reflect or scatter in a region of the visible electromagnetic spectrum to produce the desired coloration or hue. Moreover, white pigments can be combined with one or more of the cyan, magenta, yellow, red, green, or blue pigments.

In all embodiments, the (iii) tinting material is not the same material as the (i) inorganic or organic spacer particles or the (ii) solid lubricant. The (iii) tinting material, however, can be the same as or different from the tinting colorants present as (c) additives in the opacifying layer.

Thus, the (iii) tinting material can be a pigment, dye, or combination thereof, and a skilled worker can choose from hundreds of possible pigments and dyes known in the art. Pigments suitable for use as (iii) tinting materials include, but are not limited to, titanium dioxide, titanium coated mica, barium sulfate, calcium carbonate, zinc oxide, azo pigments, monoazo pigments, di-azo pigments, azo pigment lakes, Naphthol pigments, Naphthol AS pigments, benzimidazolone pigments, di-azo condensation pigments, metal complex pigments, isoindolinone and isoindoline pigments, polycyclic pigments, phthalocyanine pigments, quinacridone pigments, perylene and perinone pigments, thioindigo pigments, anthrapyrimidone pigments, flavanthrone pigments, anthanthrone pigments, dioxazine pigments, triarylcarbonium pigments, quinophthalone pigments, and diketopyrrolo pyrrole pigment. Other examples of useful tinting materials are described in [0052] of U.S. Patent Application Publication 2010/0021838 (noted above).

Such (iii) tinting material can be present in the functional composition at a dry coverage of at least 0.01 $g/m^2$ and up to and including 45 $g/m^2$ or at least 5 $g/m^2$ or up to and including 25 $g/m^2$. The actual amount of tinting material added depends on the strength or covering power of the chosen colorant(s).

The functional layer can also comprise an (iv) organic polymeric binder in which the (i) organic or inorganic spacer particles, (ii) solid lubricant, (iii) tinting material and other components are dispersed. This (iv) organic polymeric binder can be water-soluble or water-dispersible and can comprise one or more materials. In addition, the (iv) organic polymeric binder can be film-forming, that is, it can form a film once applied and dried. Such materials can be self-crosslinkable and crosslinkable using a suitable (v) crosslinking agent as described below. Useful (iv) organic polymeric binders include but are not limited to, film forming polymers such as a partially hydrolyzed polyvinyl acetate, poly(vinyl alcohol), poly(vinyl pyrrolidone), cellulosic polymers (such as carboxymethyl cellulose and hydroxymethyl cellulose), a polysaccharide, a poly(ethylene oxide), acrylamide polymers, polyester ionomers, gelatin or gelatin derivatives, gellan, starches, polyethylene imine, polyvinyl amine, and derivatives of these materials, polyurethanes, urethane-acrylic copolymers, other acrylic polymers, styrene-acrylic copolymers, vinyl polymers, and polyesters, or a combination of two or more of these organic polymer binders. Such (iv) organic polymeric binders are readily available from various commercial sources or prepared using known starting materials and synthetic conditions. A useful material is a partially hydrolyzed polyvinyl acetate obtained under the trade name SELVOL™ hydrolyzed at 88% and having an $M_w$ below 20,000. The (iv) organic polymeric binder can be useful in the functional composition for adhering the (i) organic or inorganic spacer particles and other noted components onto the outer surface of the opacifying layer and, to provide an enhanced level of abrasion resistance and cohesiveness. Thus, the (iv) organic polymeric binder can be used to prevent the functional composition from being easily removed after its application.

The (iv) organic polymeric binder can be present in an amount of at least 1 weight % and up to and including 90 weight %, or typically at least 5 weight % and up to and including 75 weight %, based on the total functional composition weight.

Additionally, it may be beneficial to chemically crosslink some (iv) organic polymeric binders to improve functional composition cohesiveness. Such (iv) organic polymeric binders can be at least partially curable or crosslinkable, and can be cured up to 100% of all potential curable or crosslinking sites. The identity and amount of a suitable (v) crosslinking agent will depend on the choice of (iv) organic polymeric binder and its reactivity with the (v) crosslinking agent, the number of crosslinking sites available, compatibility with other functional composition components, and manufacturing constraints such as formulation pot life, application means, and drying speed. Non-exclusive examples of (v) crosslinking agents include glyoxal, CARTABOND® TSI (Clariant), CARTABOND® EPI (Clariant), SEQUAREZ™ 755 (Omnova), glutaraldehyde sodium bisulfate complex (Aldrich), Sunrez 700M (Omnova), Sunrez 700C (Omnova), CR-5L (Esprix), bis(vinyl) sulfone, bis(vinyl) sulfone methyl ether, adipoyl dihydrazide, epichlorohydrin polyamide resins, and urea-formaldehyde resins. In one embodiment, a crosslinked (iv) organic polymeric binder includes a hydrolyzed polyvinyl acetate polymer that has been crosslinked using an (v) epichlorohydrin polyamide resin compound.

The functional composition can be prepared using a functional composition formulation that also include one or more wetting surfactants or coating aids to aid in the coating or deposition of the functional composition. If the application is carried out to provide a uniform functional layer using a known coating procedure, any surface-active material ("surfactant") that will lower the surface tension of the formulation sufficiently to prevent edge-withdrawal, repellencies, and other coating defects can be used. For example, useful coating aids (or wetting surfactants) include but are not limited to, alkyloxy- or alkylphenoxypolyethers and polyglycidol derivatives and their sulfates, such as nonylphenoxypoly(glycidol) that are available from Olin Matheson Corporation; sodium octylphenoxypoly(ethyleneoxide) sulfate; organic sulfates and sulfonates, such as sodium dodecyl sulfate, sodium dodecyl sulfonate, sodium bis(2-ethylhexyl)sulfosuccinate (Aerosol OT); and alkyl carboxylate salts such as sodium decanoate.

If the functional composition is to be disposed on the opacifying layer by spraying, surfactants known in the art as spreading agents that are capable of reducing the surface tension substantially to aid in the formation of small drops can also be present in the functional composition. Examples of such surfactants are trisiloxanes like SILWET® L-77 and L-7608, and acetylenic diols such as SURFYNOL® 104 and SURFYNOL® 104A.

The functional composition can include one or more of various additives that provide various properties or characteristics to the application thereof or the disposed dry composition. For example, the functional composition can include a biocide or antimicrobial agent of which there are numerous materials known in the art for this purpose (including silver metal and silver salts); antistatic agents known in the art to dissipate electrical charge and static; tactile modifiers that change the "feel" of outer surface of the foamed, opacifying element; visual modifiers that provide a matte, opalescent or other such desirable look; and soil resistance agents that reduce the potential for soiling from handling or spills. Combinations of the same or different type of material can be present.

Attractive finishes can be imparted to an outer surface of the foamed, opacifying element for example, by flocking the opacifying layer (and functional composition disposed thereon). Flock fibers (0.2 mm and up to several mm) can be disposed thereon either by electrostatic or mechanical techniques.

Method of Making Functional Compositions and Foamed, Opacifying Elements

The foamed, opacifying elements according to the present invention are prepared using essential functions A) through G) described below, although the order of functions E) and F) can be reversed. Firstly, the method is carried out by A) providing a foamable aqueous composition as described above consisting essentially of components (a) through (e) in the described amounts and having at least 35% solids and up to and including 70% solids.

The foamable aqueous composition can be B) aerated to provide a foamed aqueous composition having a foam density of at least 0.1 g/cm$^3$ and up to and including 0.5 g/cm$^3$, or of at least 0.15 g/cm$^3$ and up to and including 0.4 g/cm$^3$, or even of at least 0.15 g/cm$^3$ and up to and including 0.27 g/cm$^3$. This aeration procedure can be carried out using suitable conditions and equipment that would be readily apparent to one skilled in the art in order to create a "foam," for example in the presence of a foaming agent that is present as a (c) additive surfactant described above. For example, aeration can be carried out by mechanically introducing air or an inert gas (such as nitrogen or argon) in a controlled manner. High shear mechanical aeration can be carried out using sonication or high-speed mixers, such as those equipped with a cowles blade, or with commercially available rotorstator mixers with interdigitated pins such as an Oakes mixer or a Hobart mixer, by introducing air under pressure or by drawing atmospheric air into the foamable aqueous composition with the whipping action of the mixer. Suitable foaming equipment can be used in a manner to provide the desired foam density with modest experimentation. It can be useful to chill or cool the foamable aqueous composition below ambient temperature to increase stability by increasing composition viscosity, and to prevent its collapse. This chilling operation can be carried out immediately before, immediately after, or during the B) aeration procedure. Stability of the foamed aqueous composition can also be enhanced by the presence of a foam stabilizing agent as another of the (c) additives.

Once the foamed aqueous composition has been formed, it can be C) disposed onto a first opposing side of a suitable substrate (described above), such as a porous woven substrate that also has a second opposing surface. This procedure can be carried out in any suitable manner that does not undesirably diminish the foam density (or foam structure) of the foamed aqueous composition. For example, the substrate can be coated with the aqueous foamed composition using any suitable known coating equipment (floating knife, hopper, blade, or gap) and coating procedures including but not limited to, blade coating, gap coating such as "knife-over-roll" and "knife over table" operation, floating knife, slot die coating, or slide hopper coating, especially if multiple layers are applied to the substrate in the same operation. Useful layer forming (coating) means are described, for example, in U.S. Pat. No. 4,677,016 (noted above), the disclosure of which is incorporated herein by reference.

In many embodiments, the foamed aqueous composition can be disposed directly onto the first opposing surface of the substrate ("directly" means no intervening or intermediate layers).

The amount of foamed aqueous composition to be applied should be sufficient to provide a dry foamed composition or opacifying layer on the first opposing surface of the substrate having a dry coverage of less than or equal to 10 ounces (mass)/yard$^2$ (or less than or equal to 339.08 g/m$^2$), or at a dry coverage of at least 1.5 ounces (mass)/yard$^2$ (or 50.86 g/m$^2$) and up to and including 7 ounces (mass)/yard$^2$ (237.35 g/m$^2$).

Once the foamed aqueous composition has been formed on the first opposing surface of the substrate, it can be D) dried, wherein "dry" is defined in relation to the amount of (d) aqueous medium that is present, as described above for the dry foamed aqueous composition or opacifying layer. There may be some unintentional curing of the (b) binder material at this point, but it is generally not desirable for substantial curing to take place during drying. Drying can be accomplished by any suitable means such as by heating with warm or hot air, microwaves, or IR irradiation at a temperature and time sufficient for drying (for example, at less than 160° C.) to provide a dry foamed composition.

After drying, the dry foamed composition on the substrate can be E) crushed or densified on the substrate, and F) cured, in this order or in the opposite order. Thus, these operations can be carried out as E) densifying (crushing) and then F) curing, or as F) curing and then E) densifying (crushing). An opacifying layer is formed using this combination of functions, and the F) curing function converts most if not all of the (b) binder material to (b') matrix material.

E) Densification or crushing is a process of subjecting the dry foamed composition to mechanical pressure, to densify and to reduce its thickness. This process can be carried out in any suitable manner but it is generally carried out by a process that provides pressure to the dry foamed composition, for example, by passing the substrate with the dry foamed composition through a compression calendering operation, pressing operation, or embossing operation, or a combination thereof. For example, the coated substrate can be pressed between flat plates or through nip rollers under pressure, or it can be passed through a combination of calendering and embossing rollers to reduce the thickness of the dry foamed composition and to densify the foam therein. The original thickness of the dry foamed composition can be reduced by at least 20% during such an operation. This process can be considered a "densifying operation" as the dry foamed composition is made denser while it is pressed together. The thickness of the dry foamed composition before and after crushing (densifying) can be determined by a known technique such as laser profilometry.

The crushing or densifying process can be carried out at any suitable temperature including room temperature (for example, 20-25° C.) and up to and including 90° C., or more likely at a temperature of at least 20° C. and up to and including 80° C. The crushing or densifying process is carried out at nip pressures that are suitable for the construction of the substrate including the openness factor to prevent over crushing and consequent loss of uniform opacity of the opacifying layer. A useful crushing pressure can be determined using routine experimentation depending upon several factors including the foamed aqueous composition formulation and type of substrate used. For example, a useful crushing pressure can be at least 15 psi (103.4 kPa) and up to and including 200 psi (1379 kPa).

F) Curing the b) binder materials to form (b') matrix materials can be carried out before or after the E) densification or crushing operation by heat or radiation or other conditions to which the (b) binder materials and catalysts are responsive for crosslinking. In some embodiments, a suitable functionalized self-crosslinking latex composition can be used as the (b) binder material. During this operation, a curing or crosslinking reaction can occur between reactive side groups of suitable curable polymer chains. If the chosen (b) binder material is not itself heat reactive, suitable catalysts and curing (crosslinking) agents can be added to the foamable aqueous composition to promote curing or crosslinking.

The resulting foamed, opacifying element can exhibit a bending stiffness (or "bending force") as determined using the L&W Stiffness Test (described below) of at least 0.15 milliNewtons meter (mN-m).

At some time after the D) drying operation, the method according to this invention comprises G) disposing a functional composition (as described above) as a functional composition formulation, over either the dry foamed composition or the opacifying layer, depending upon the timing of this operation. In many embodiments, the functional composition formulation is disposed directly on either the dry foamed composition or the opacifying layer. Thus, G) disposing the functional composition can be carried out in any of the following sequences of operations, I through VI, with sequences II and V being particularly useful:

I. D) drying, G) disposing, E) crushing, and F) curing;
II. D) drying, E) crushing, G) disposing, and F) curing;
III. D) drying, E) crushing, F) curing, and G) disposing;
IV. D) drying, G) disposing, F) curing, and E) crushing;
V. D) drying, F) curing, G) disposing, and E) crushing; and
VI. D) drying, F) curing, E) crushing, and G) disposing.

The functional protective composition can be disposed on the dry foamed composition or the opacifying layer using any number of suitable application techniques such as uniformly or non-uniformly spraying, wrapped wire rod coating, rotary screen coating, air knife coating, gravure coating, reversed roll coating, slot coating, gap coating, blade coating, extrusion hopper coating, roll coating, slide coating, curtain coating, froth coating, pad coating, and other techniques that would be readily apparent to one skilled in the art. For example, coating can be carried out with an engraved flexible or non-flexible roller in an "anilox coating system" where the aqueous functional composition formulation, usually of controlled viscosity, is deposited on the flexible or non-flexible roller. A doctor blade is used to meter excess fluid from the surface leaving just the measured amount of fluid in the engraved cells. The anilox roll then rotates to contact the outer surface of the opacifying layer that receives the aqueous fluid from the cells.

A uniform coating (functional composition layer) can be formed over (or directly on) the dry foamed composition or the opacifying layer, or discontinuous applications can be made to provide regular or irregular patterns by spraying or other techniques. When disposed in a discontinuous manner, the functional composition can be present as isolated discontinuous patterns or coalesce to form a uniform deposition on to the opacifying layer.

After application of the functional composition formulation to the opacifying element, the functional composition is generally dried by simple evaporation of water (and any other solvents), which drying can be accelerated by known techniques such as convection heating including forced air or infrared heating to provide a foamed, opacifying element according to the present invention. Further details of coating and drying techniques are described in further detail in Research Disclosure No. 308119, December 1989, pages 1007-1008 and in references cited therein. Curing of the disposed functional composition can also be carried out during or subsequently to drying at temperatures for example, from 100-160° C.

In some embodiments, the resulting disposed functional composition layer can comprise both the (i) inorganic or organic spacer particles and the (iii) tinting material.

In other embodiments, the disposed functional composition can comprise the (i) inorganic or organic spacer particles but not the (iii) tinting material, and a (ii) solid lubricant can be present if desired.

After the G) disposing (and drying) procedure, and optionally curing, it is possible to provide an embossed design on an outer surface of the foamed, opacifying element, for example by patterned embossing or calendering the outer surface, to create selected regions of high or low opacity and thickness. The resulting embossed design can be viewed from either side in transmission.

It is further possible to print images on either the first outer surface or the second outer surface of the foamed, opacifying element after the G) disposing procedure, drying, and optionally curing, using any suitable printing means such as inkjet printing or flexographic printing, thereby forming printed images of text, pictures, symbols, or combinations thereof. Such printed images can be visible, or they can invisible to the unaided eye (for example, using fluorescent dyes in the printed images). Alternatively, the first outer surface or the second outer surface can be covered by suitable means with a colorless layer to provide a desired protective finish. In many instances, the image formed in this manner, for example, on one outer surface, is not visible or discernible from the other outer surface.

A thermally printed image can be formed on either the first outer surface or the second outer surface, for example, by using a thermal (sublimable) dye transfer printing process (using heat and with or without pressure) from one or more thermal donor elements comprising a dye donor layer comprising one or more dye sublimation printable colorants. For example, a thermal colorant image can be obtained using one or more thermal dye patches with or without a thermal colorless (clear) patch. Useful details of such a process are provided in copending and commonly assigned U.S. Ser. No. 15/590,342 (filed May 9, 2017 by Nair and Herrick), the disclosure of which is incorporated herein by reference.

The present invention provides at least the following embodiments and combinations thereof, but other combinations of features are considered to be within the present invention as a skilled artisan would appreciate from the teaching of this disclosure:

1. A method for providing a foamed, opacifying element, the method consisting essentially of:

A) providing a foamable aqueous composition that has at least 35% solids and up to and including 70% solids, and consists essentially of:

(a) at least 0.05 weight % and up to and including 15 weight % of porous particles, each porous particle comprising a continuous polymeric phase and discrete pores dispersed within the continuous polymeric phase, the porous particles having a mode particle size of at least 2 μm and up to and including 50 μm;

(b) at least 20 weight % and up to and including 70 weight % of a binder material having a glass transition temperature ($T_g$) of less than 25° C.;

(c) at least 0.0001 weight % and up to and including 30 weight % of one or more additives comprising a surfactant;

(d) water;

(e) at least 0.001 weight % of an opacifying colorant different from all the one or more (c) additives, which opacifying colorant absorbs electromagnetic radiation having a wavelength of at least 380 nm and up to and including 800 nm, all amounts based on the total weight of the foamable aqueous composition;

B) aerating the foamable aqueous composition to provide a foamed aqueous composition having a foam density of at least 0.1 g/cm³ and up to and including 0.5 g/cm³;

C) disposing the foamed aqueous composition onto a first opposing surface of a substrate also having a second opposing surface;

D) drying the foamed aqueous composition, without substantial curing of the binder material, to provide a dry foamed composition on the first opposing surface;

E) densifying the dry foamed composition;

F) curing the dry foamed composition to convert the (b) binder material to a (b') matrix material, wherein E) densifying and F) curing can be carried out in the indicated order or in the opposite order, to provide a foamed, opacifying element having an opacifying layer, and wherein, at any time after D) drying, the method further comprises G) disposing a functional composition onto either the dry foamed composition or the opacifying layer, and drying the disposed functional composition, the functional composition comprising either or both of: (i) inorganic or organic spacer particles having a mode particle size of at least 1 μm and up to and including 100 μm, and which inorganic or organic spacer particles resist melt flow at a pressure of up to and including 100 psi (689.5 kPa) and a temperature of up to and including 220° C.; and (iii) a tinting material comprising one or more pigments, one or more dyes, or a combination thereof, wherein the (i) inorganic or organic spacer particles and the (iii) tinting material are different materials.

2. The method of embodiment 1, wherein the (iii) tinting material can be present to provide a ΔE of a least 3.5 relative to a foamed, opacifying element from which the functional composition has been omitted.

3. The method of embodiment 1 or 2, wherein the disposed functional composition is cured.

4. The method of any of embodiments 1 to 3, comprising G) disposing the functional composition using spray coating, gap coating, roll coating, or coating with an engraved roller.

5. The method of any of embodiments 1 to 4, wherein the disposed functional composition comprises both the (ii) inorganic or organic spacer particles and the (iii) tinting material.

6. The method of any of embodiments 1 to 5, comprising G) disposing the functional composition between E) densifying and F) curing.

7. The method of any of embodiments 1 to 6, wherein the foamed, opacifying element is desired to have an L* value greater than 80.

8. The method of any of embodiments 1 to 7, wherein the (iii) tinting material comprises one or more white pigments that can be titanium dioxide, barium sulfate, calcium carbonate, or a combination of two or more of these materials.

9. The method of any of embodiments 1 to 8, wherein the (iii) tinting material comprises one or more of a cyan, yellow, magenta, red, green, or blue pigment.

10. The method of any of embodiments 1 to 9, wherein the (i) inorganic or organic spacer particles are present in the disposed functional composition at a dry coverage of at least 0.001 g/m² and up to and including 30 g/m².

11. The method of any of embodiments 1 to 10, wherein the disposed functional composition has a dry coverage of at least 0.1 g/m² and up to and including 50 g/m².

12. The method of any of embodiments 1 to 11, wherein the (i) inorganic or organic spacer particles are present in the functional composition and comprise natural or synthetic silica; talc; clay; mica; nylon; a polytetrafluoroethylene; a crosslinked styrenic polymer; a crosslinked polyacrylate or polymethacylate; or a combination of two or more of these materials.

13. The method of any of embodiments 1 to 12, wherein the functional composition further comprises a (ii) solid lubricant that is a nonliquid wax, a metal ester of a fatty acid, graphite, a silicone-based polymer, a fluoropolymer, or a combination of two or more of these materials, and the (ii) solid lubricant is different from both the (i) inorganic or organic spacer particles and the (iii) tinting material.

14. The method of embodiment 13, wherein the (ii) solid lubricant is present in the disposed functional composition at a coverage of at least 0.01 g/m² and up to and including 30 g/m².

15. The method of any of embodiments 1 to 14, wherein the functional composition further comprises a biocide, antistatic agent, tactile modifier, visual modifier, alkali metal salt, alkaline earth metal salt, soil resistance agent, a coating aid, or any combination of two or more of these materials.

16. The method of any of embodiments 1 to 15, wherein the functional composition further comprises an (iv) organic polymeric binder that is a poly(vinyl alcohol), a cellulosic polymer, poly(ethylene oxide), poly(vinyl pyrrolidinone), acrylic polymer latex, polyurethane latex, gelatin or gelatin derivative, gellan, a polysaccharide, or a combination of two or more of these materials.

17. The method of embodiment 16, wherein the functional composition further comprises a (v) crosslinking agent for the (iv) organic polymeric binder.

18. The method of any of embodiments 1 to 17, wherein the substrate is a woven textile comprised of a polyester or a thermoplastic polymer-coated fiberglass.

19. The method of any of embodiments 1 to 18, wherein the substrate has an openness of at least 0% and up to and including 10%.

20. The method of any of embodiments 1 to 19, wherein the (a) porous particles that have a mode particle size of at least 3 μm and up to and including 20 μm, and are present in an amount of at least 0.5 weight % and up to and including 20 weight %, based on the total weight of the opacifying layer.

21. The method of any of embodiments 1 to 20, wherein the (e) opacifying colorant is present in the pores of the (a) porous particles.

22. The method of any of embodiments 1 to 21, wherein carbon black is present as the (e) opacifying colorant in an amount of at least 0.002 weight % and up to and including 1 weight %, based on the total weight of the opacifying layer.

23. The method of any of embodiments 1 to 22, wherein the continuous polymeric phase of the (a) porous particles comprises one or more cellulose polymers selected from the group consisting of cellulose acetate, cellulose butyrate, cellulose acetate butyrate, cellulose acetate propionate, and a combination of two or more of these materials.

24. The method of any of embodiments 1 to 23, wherein the (b) binder material has a glass transition temperature equal to or less than −10° C.

25. The method of any of embodiments 1 to 24, wherein the one or more (c) additives of the foamable aqueous composition comprise either a flame retardant, a biocide, or both a flame retardant and a biocide.

26. The method of any of embodiments 1 to 25, wherein the opacifying layer is present in the foamed, opacifying element at a dry coverage of less than or equal to 10 ounces/yard$^2$ (339.08 g/m$^2$).

27. The method of any of embodiments 1 to 26, further comprising:
cooling the foamable aqueous composition below ambient temperature during B) aerating.

28. The method of any of embodiments 1 to 27, comprising:
E) densifying the dry foamed composition by a compression calendaring operation, pressing operation, or embossing operation, or a combination thereof.

29. The method of any of embodiments 1 to 28, wherein E) densifying is carried out at a pressure of at least 15 psi (103.4 kPa) and up to and including 200 psi (1379 kPa).

30. The method of any of embodiments 1 to 29, comprising:
B) aerating the foamable aqueous composition to provide the foamed aqueous composition having a foam density of at least 0.15 g/cm$^3$ and up to and including 0.27 g/cm$^3$.

31. The method of any of embodiments 1 to 30, further comprising, after G) disposing the functional composition, printing an image on an outer surface of the foamed, opacifying element.

32. The method of embodiment 31, comprising printing the image using one or more dye sublimation thermal transfer colorants and a dye sublimation thermal transfer process.

33. The method of any of embodiments 1 to 32, comprising G) disposing the functional composition directly on the opacifying layer.

The following Examples are provided to illustrate the practice of this invention and are not meant to be limiting in any manner. The following materials were used in the Examples.

Materials Used in the Following Examples:
The continuous polymeric phase polymers used in the following examples were the EASTMAN™ Cellulose Acetate Butyrate 381-0.5 (CAB), a cellulose ester, T$_g$ of 130° C. (obtained from Chem Point).

NALCO® 1060 containing colloidal silica was obtained from Nalco Chemical Company as a 50 weight % aqueous dispersion.

The poly(methylamino ethanol adipate) (AMAE co-stabilizer) was prepared using known procedures and starting materials.

Carboxy methylcellulose (CMC, 250,000 kDa) was obtained from Ashland Aqualon as AQUALON™ 9 M31F.

The amphiphilic block copolymer of polyethylene oxide and polycaprolactone (PEO-b-PCL) 5K-20K, was prepared using the procedure described in U.S. Pat. No. 5,429,826 (Nair et al.) where the first number is the molecular weight of the hydrophilic block segment, PEO, and the second number is the molecular weight of the oleophilic block segment, PCL.

TERGITOL® 15-S-7, a C12-C14 secondary alcohol surfactant having an HLB value of 12.4, was obtained from the Dow Chemical Corporation.

The optical brightener TINOPAL® OB CO was obtained from BASF Corporation.

Poly(vinyl alcohol) (PVA), 88% hydrolyzed, (SELVOL™ Polyvinyl Alcohol 203) was obtained from Sekisui Chemical Company.

SILWET® L-77, a trisiloxane surfactant was obtained from Momentive.

A 50 weight % aqueous dispersion of calcium stearate, used as a (ii) solid lubricant, was obtained from American eChem.

AQUAFLON® 52, a 50 weight % aqueous dispersion of 4 micrometer PTFE particles, was obtained from Shamrock Industries.

ORGASOL® 2001 EXD NAT 1, 10 micrometer sized nylon particles were obtained from Arkema Inc.

LANCO 1799, micronized polytetrafluoroethylene (PTFE) was obtained from Lubrizol.

POLYCUP™ 172 is PAE resin crosslinking agent for PVA and was obtained from Solenis.

Styrene-co-divinyl benzene copolymer ("SD matte"), 6 μm matte beads, were used as (i) organic spacer particles, and were made in-house using known suitable ethylenically unsaturated polymerizable monomers and a known polymerization procedure.

KRONOS® 2310 titanium dioxide (TiO$_2$) used as (iii) tinting material and was obtained from Kronos International.

MAXXSPERSE® 3000, a polymeric dispersant, was obtained from McTron Technologies and was used as a dispersing aid for dispersing the TiO$_2$ in water prior to introducing the TiO$_2$ to a functional composition formulation.

The carbon black (K) was used as an (e) opacifying colorant in the form of an aqueous dispersion available as Black Pearls 880 obtained from Cabot Corporation.

Green tinting material (PG) was used as (iii) tinting material in the form of a pigment mixture containing 21 weight % of pigment Yellow 74, obtained from Clariant and 79 weight % of HELIOGEN® D 8730 pigment, obtained from BASF.

DISPERSBYK® 022, a silicone based defoamer, was obtained from BYK-Chemie USA.

SOLSPERSE® 43000, a polyacrylate polymeric dispersant, was obtained from Lubrizol Corp.

Polymeric dispersant P1, a copolymer derived from benzyl methacrylate, stearyl methacrylate, and methacrylic acid at a feed weight ratio of 37:30:33 and having a weight average molecular weight of 8,700 was made in-house using a known procedure. It was used as a dispersant for the green tinting material PG.

The porous substrates used in the Examples below were composed of a polyester, having a weight of about 80-110 g/m².

The foamable aqueous composition (CF drapery compound) was made from a formulation comprising a self-crosslinking copolymer derived from n-butyl acrylate, ethyl acrylate, and N-methylol acrylamide using a known procedure, and having a glass transition temperature ($T_g$) of approximately −25° C. as the (b) binder material from which the (b') matrix material was derived, (c) additives titanium dioxide, clay filler, a flame retardant, and surfactants for foam creation and stabilization.

Measurements:

The mode particle size of the (a) porous particles was measured using a Sysmex FPIA-3000 Flow Particle Image Analyzer available from Malvern Panalytical. The particle size of the dispersed pigments was determined using light scattering.

The porosity of the (a) porous particles was measured using a modified version of the known mercury intrusion porosimetry method.

The light blocking ability of each foamed, opacifying element in the Examples, in transmitted light, was evaluated by measuring its optical density (OD) using a custom-built apparatus consisting of a fiber optic Xenon light source, a computer controlled translational stage, and an optical photometer. The fiber optic was positioned 10 mm above the surface of the fabric. A photodetector was placed on the other side of each sample element directly under the fiber optic in order to quantify the amount of light that passed through the sample element. The optical density (OD) of each element sample was calculated by comparing the light that passed through the element sample to the light that reached the detector when no element sample was present.

The luminous reflectance (or brightness) of each element sample was determined by first measuring the spectral reflectance in the 400-700 nm wavelength range using a Hunter Labs UltraScan XE colorimeter equipped with an integrating sphere and a pulsed Xenon light source and appropriate filters for standard D65 illumination. A light trap and standard white tile were used to fix the reflectance range from 0 to 100%. The X, Y, and Z tristimulus values of each dry opacifying layer were also determined and used in conjunction with the CIELab color space to calculate specific values for the lightness (L*), red-green character (a*), and yellow-blue character (b*) of each opacifying layer. The Y tristimulus value was used as a measure of the luminous reflectance or "brightness" (L*) of each sample.

The ΔE 2000 values reported herein were computed using an online calculator (that employs the 2000 CIE ΔE formulae) at http://www.brucelindbloom.com/ by inputting the L*, a*, and b* values computed by the above method.

Appearance and Tactile Feel:

Subjective evaluation of the functional composition side of the element were carried out on the appearance and tactile feel.

Thermal Resilience:

To evaluate the performance of the functional composition in a thermal sublimation dye transfer printing process, each foamed, opacifying element was placed between a heated block (425° F., or 218° C.) and a Kapton belt at ambient temperature, under a pressure of 3 psi (20.7 kPa) for 32 seconds. The fabric substrate side of the foamed, opacifying element was in contact with the heated block while the functional composition and opacifying layer were in contact with the Kapton belt. After releasing the pressure, each foamed, opacifying element was evaluated for its ease of release from the Kapton belt, the appearance of the opacifying layer side after release. and if there was any material transferred to the Kapton belt. Particular attention was paid to the gloss of the functional composition after the release, because a glossy appearance in the resulting foamed, opacifying element is undesirable.

Resistance to Blocking:

The tendency of the opacifying layer and functional composition towards blocking was also evaluated by folding the foamed, opacifying element face to face on the opacifying layer side and keeping it in an oven at 40° C. and 50% Relative humidity for 22 hours, under a 1 kg load after which the two folded halves were separated. The quality and visual appearance of the functional composition after this separation was evaluated.

Preparation of Pigment Dispersions for Porous Particles and Functional Compositions:

Both pigment colorant dispersions [including (e) opacifying colorants and (c) tinting colorants] were prepared by combining dry pigment(s), a dispersant and described in TABLE I below, and an aqueous medium in a suitable milling vessel. The particle size of each pigment was reduced by milling it using ceramic media until all pigment particles were reduced below a diameter of 1 μm as determined by optical microscopy. The colorant dispersions were further diluted in the same aqueous medium for incorporation into (a) porous particles or foamed aqueous composition. The colorant dispersions were varied in the type of pigment colorant, dispersant, and dispersant level relative to pigments as shown below in TABLE I in which the Colorant Dispersions are identified by the respective colored pigments (K, PG, and $TiO_2$).

TABLE I

Colorant Dispersions

| Dispersion | Pigment | Dispersant (weight % of Pigment) | Pigment Weight % |
|---|---|---|---|
| D-K ("black") | K | SOLSPERSE® 43000 (5) DISPERSBYK® 022 (0.05) | 25 |
| D-G ("green") | PG | P1 (12.55) | 17.94 |
| D-W ("white") | $TiO_2$ | MAXXSPERSE® 3000 (2) | 70 |

Preparation of (a) Porous Particles PP:

The (a) porous particles PP used for preparing a foamed, opacifying element contained 1 weight % of optical brightener (identified below) in the continuous CAB polymeric phase and 0.8 weight % opacifying colorant (K) in the discrete pores.

An aqueous phase was made up by dissolving 5 grams of CMC in 240.5 grams of distilled water and adding to it 4.3 grams of the D-K dispersion containing 18.6 weight % of carbon black. This aqueous phase was dispersed in 831.8 grams of an oil phase containing 97.7 grams of CAB, 2 grams of PEO-b-PCL, and 1 gram of the optical brightener, TINOPAL® OB CO in ethyl acetate, using a homogenizer. A 975-gram aliquot of the resulting water-in-oil emulsion was dispersed using the Silverson L4R homogenizer for two minutes at 1200 RPM, in 1625 grams of a 200 mmolar pH 4 acetate buffer containing 39 grams of NALCO® 1060 colloidal silica, and 9.75 grams of AMAE co-stabilizer followed by homogenization in an orifice homogenizer at 1000 psi (70.4 kgf/cm$^2$) to form a water-in-oil-in-water double emulsion. The ethyl acetate was removed under reduced pressure at 40° C. after dilution of the water-in-oil-in-water emulsion with an equal weight of water. The resulting suspension of solidified porous particles PP was filtered and the isolated porous particles PP were washed with water several times, followed by rinsing with a 0.05 weight % solution of TERGITOL® 15-S-7 surfactant. The isolated porous particles PP were then air dried. They had a mode particle size of 5.4 µm and a porosity of 46 volume %. Typically, the discrete pores contained within the porous particles PP prepared according to this procedure had an average diameter of from 150 nm and up to and including 1,500 nm. The moisture content of the final powder was 56%.

Preparation of Foamable Aqueous Compositions; Foamed Aqueous Compositions; and Foamed, Opacifying Element A1:

A foamable aqueous composition containing porous particles PP was prepared by combining 191 grams of porous particles PP with 1209 grams of CF drapery compound. Porous particles PP were dispersed into the mixture by stirring at 1200 rev/minute using a 50-mm diameter Cowles blade at ambient temperature for 30-60 minutes. The resulting foamable aqueous composition was used to prepare a foamed aqueous composition under pressure using an Oakes 2M Laboratory Mixer Model 2MBT1A. Each resulting foamed aqueous composition, having a foam density of from 0.18 g/cm$^3$ to 0.25 g/cm$^3$, was coated onto a ("first opposing") surface of the porous substrate described above using a coating knife, dried at a temperature of from 85° C. to 145° C. until the moisture content was less than 2 weight %, and crushed ("densified") on the porous substrate between hard rollers under pressure. The dried and crushed opacifying composition was further cured at 160° C. for 2 minutes to crosslink the (b) binder material and form the resulting (b') matrix material. The resulting foamed, opacifying element A1 was used to create element samples using a functional composition according to the present invention. This foamed, opacifying element exhibited an optical density (OD) of 5.4 for the dry opacifying layer weight of 168 g/m$^2$.

Preparation of Functional Composition Formulations:

A 20% solution of PVA as a (iv) organic polymeric binder was prepared by mixing it in dry form with water at 80° C. The resulting PVA solution, the (i) inorganic or organic spacer particles, the D-W white colorant dispersion and the green dispersion D-G [when each was used at (iii) tinting material] were combined with the required quantity of water to obtain a 1 weight % PVA solution with the functional components of the invention. All functional composition formulations contained 0.1 weight % of SILWET® L-77 surfactant. POLYCUP' 172 was used at 2 weight % of the PVA solution as a (v) crosslinking agent with some of the variants where mentioned.

Forming Functional Composition:

The foamed, opacifying element A1 was cut into 4-inch (10.2 cm)×2 inch (5.08 cm) rectangular element samples, and each element sample was weighed to determined "original" weight and then mounted vertically onto a hard surface. The functional composition formulations were then sprayed using an atomizing paint sprayer onto the opacifying layer of an element sample to provide varying dry coverages (when dried). Each thusly disposed functional composition was dried at 85° C. for 30 minutes, after which each element sample was weighed and its weight was compared to the "original" weight to determine the dry coverage of the disposed functional composition. Each element sample was then subjected to heat at 160° C. in an oven for 5 minutes to crosslink the PVA in the functional composition, resulting in multiple foamed, opacifying elements according to the present invention, having a functional composition disposed on the opacifying layer.

Results for Foamed, Opacifying Element without (iii) Tinting Material in Functional Composition The following TABLE II shows the various evaluations of the element samples of foamed, opacifying elements described above, wherein the functional composition contained no (iii) tinting material.

TABLE II

| Spacer Particles (SP) | Size of spacer particles | Functional Composition (weight percentages) | Dry Coverage of Functional Composition (g/m$^2$) | Tactile Response | Thermal Resilience Release from Kapton | Appearance of coating after separation from Kapton | Resistance to Blocking Deformation of Surface |
|---|---|---|---|---|---|---|---|
| None Control 1 | | | | Sticky feel | Adhered, peeled off, light residue on Kapton | Glossy | Face to face sticking; hard to peel apart |
| None Control 2 | | 1% PVA | 10.1 | Similar to Control 1 | Adhered more strongly than Control 1; no residue | Glossy | Very little sticking; no obvious deformation |
| None Control 3 | | 1% PVA with POLYCUP ™ 172 | 10.8 | Not sticky | Slight adherence to Kapton; very light residue | Non-uniform gloss | No sticking; no deformation |
| Calcium Stearate* Control 4 | <1 µm | 1% PVA, 2.5% Calcium stearate | 18.3 | Better feel compared to Control 1 | Some adherence to Kapton; light residue | Slight gloss | No sticking; no deformation |
| ORGASOL ® 2001 EX D NAT Invention 1 | 10 µm | 1% PVA, 1% SP | 10.2 | Good feel | Slight adherence to Kapton; no residue | No gloss | No sticking; no deformation |
| SD Matte Invention 2 | 6 µm | 1% PVA, 2% SP | 17.5 | Good feel | No sticking; no residue transferred | No gloss | No sticking; no deformation |
| SD Matte Invention 3 | 6 µm | 1% PVA, 2% SP, with | 9.6 | Good feel | Slight adherence to Kapton; no residue | No gloss | No sticking; no deformation |

TABLE II-continued

| Spacer Particles (SP) | Size of spacer particles | Functional Composition (weight percentages) | Dry Coverage of Functional Composition (g/m²) | Tactile Response | Thermal Resilience Release from Kapton | Appearance of coating after separation from Kapton | Resistance to Blocking Deformation of Surface |
|---|---|---|---|---|---|---|---|
| AQUAFLON ® 52 Invention 4 | 4 μm | POLYCUP ™ 172 1% PVA, 2.5% SP | 20.1 | Good feel | Slight adherence to Kapton; no residue | Very slight gloss | Very little sticking; no deformation |

*Calcium stearate particles have a mode particle size that is less than 1 μm and thus are too small to be (i) inorganic or organic spacer particles according to this invention, but calcium stearate is a suitable (ii) solid lubricant according to the present invention.

Based on the results presented in TABLE II, when no functional composition was present (Control 1), the opacifying layer did not survive the hot contact surface used for thermal dye sublimation printing, and it did not transport well in a thermal printer. Control 2 which comprised only the binder (PVA) in the functional composition reduced the sticking due to blocking, but under high temperature, it exhibited difficult release from the Kapton film. In addition, after the release the surface appeared glossy which is an undesirable feature. Control 3 which had PVA and a cross-linker exhibited less of a release problem from the Kapton belt, but exhibited an undesirable glossy appearance of the released surface. The functional composition containing the calcium stearate (Control 4) having a particle size of less than 1 μm also exhibited some adhesion to the Kapton and some residue after peeling, but there was still undesirable gloss. Calcium stearate is a suitable (ii) solid lubricant according to the present invention; but it is not (i) inorganic or organic spacer particles due to the small particle size. The embodiments (Inventions 1 to 4) that contained (i) inorganic or organic spacer particles according to the present invention exhibited less adhesion to the Kapton and less residue after separation. The presence of the (i) inorganic or organic spacer particles according to the present invention also helped reduce the gloss of the surface caused by the Kapton film. Surface gloss is not desirable for appearance and feel of foamed, opacifying elements having a fabric substrate. With respect to blocking, the foamed, opacifying element containing no functional composition (Control 1) exhibited sticking, which required force to separate the surfaces. The foamed, opacifying elements according to the present invention (Inventions 1-4) peeled apart easily.

Results for Foamed, Opacifying Element with (iii) Tinting Material in Functional Composition Several variations of a functional composition containing a (iii) tinting material ($TiO_2$ or Colorant Dispersion D-G) were disposed on rectangular samples of foamed, opacifying element A1. All embodiments, except Control 5, comprised a solution of 1 weight % PVA and SILWET® L-77 surfactant at a level of 0.1 weight %. POLYCUP™ 172 crosslinking agent was present at 2 weight % of the PVA in the functional composition used in Invention 7. Variations in all these functional composition components contained a (iii) tinting material with either or both (i) inorganic or organic spacer particles and a (ii) solid lubricant (calcium stearate).

The following TABLE III shows the various evaluations obtained for these embodiments.

TABLE III

| | Coating Assessments | | | | | | | | | |
|---|---|---|---|---|---|---|---|---|---|---|
| Spacer Particle (SP) | Solution composition (by weight) | Dry Coverage of Functional Composition (g/m²) | Color relative to Element A1 without (iii) Tinting Material | Release from Kapton | Appearance of Coating after release from Kapton | Blocking Test | CIELab Values | | | ΔE Relative to Control 5 |
| | | | | | | | L* | a* | b* | |
| None Control 5 | | | N/A | Adhered, peeled off, light residue on Kapton | Glossy | Face to face sticking; hard to peel apart | 73.44 | 0.25 | −1.41 | 0 |
| None Invention 5 | 1% PVA, 20% $TiO_2$ | 22.2 | Lighter in color; | Some adherence to Kapton; light residue on Kapton | Glossy | No sticking; peeled apart easily | 75.25 | −0.29 | −1.71 | 1.58 |
| Calcium Stearate* Invention 6 <1 μm | 1% PVA, 20% $TiO_2$, 2.5% Calcium stearate | 31.4 | Near white; | Some adherence to Kapton; very light residue | Some gloss | No sticking; peeled apart easily | 90.49 | −1.29 | −1.73 | 11.8 |
| LENCO 1799 10 μm Invention 7 | 1% PVA, 20% $TiO_2$, 2.5% SP | 34.8 | Near white; | Very little adhering to Kapton; no residue | Some gloss | No sticking; peeled apart easily | 90.93 | −1.31 | −1.50 | 12.04 |
| ORGASOL ® 2001 EX D NAT 1 10 μm Invention 8 | 1% PVA, 20% $TiO_2$, 2% SP | 35 | Near white; | No adherence to Kapton; no residue | No gloss | No sticking; peeled apart easily | 84.55 | −1.00 | −2.59 | 8.05 |
| AQUAFLON ® | 1% PVA, 20% | 38.5 | White | No adherence to | No gloss | No sticking; | 92.58 | −1.32 | −1.15 | 13.04 |

TABLE III-continued

| | | Coating Assessments | | | | | | | | |
|---|---|---|---|---|---|---|---|---|---|---|
| Spacer Particle (SP) | Solution composition (by weight) | Dry Coverage of Functional Composition (g/m²) | Color relative to Element A1 without (iii) Tinting Material | Release from Kapton | Appearance of Coating after release from Kapton | Blocking Test | CIELab Values L* | a* | b* | ΔE Relative to Control 5 |
| 52 4 μm Invention 9 | TiO₂, 2.5% SP | | | Kapton; no residue | | peeled apart easily | | | | |
| AQUAFLON® 52 4 μm Invention 10 | 1% PVA, 20% TiO₂, 2.5% SP + 3 drops of D-G | 30 | Light green; | No adherence to Kapton; no residue | No gloss | No sticking; peeled apart easily | 86.75 | −16.59 | −3.53 | 18.71 |
| SD Matte 6 μm Invention 11 | 1% PVA, 2% SP, 3 drops of D-G | 31 | Grey green; uniform | No adherence to Kapton; no residue | No gloss | No sticking; peeled apart easily | 68.92 | −7.99 | −2.46 | 10.38 |
| SD Matte 6 μm Invention 12 | 1% PVA, 2% SP | 9.61 | Grey | No adherence to Kapton; no residue | No gloss | No sticking; peeled apart easily | 71.06 | 0.51 | −3.59 | 2.74 |

*Same comment for calcium stearate as in TABLE II.

The results displayed in TABLE III show that the combination of the (iii) tinting material and the (i) inorganic or organic spacer particles provided foamed, opacifying elements that did not stick or transfer material to the Kapton film even at high temperatures the during thermal sublimation dye printing process. The blocking results showed that the foamed, opacifying element lacking a functional composition (Control 5) exhibited blocking and was hard to peel apart, whereas the foamed, opacifying elements (Inventions 5-12) according to the present invention peeled apart readily.

The presence of the (iii) tinting material provided a visual appearance of the element sample that was changed relative to the original element sample (Control 5) from which functional composition was omitted, as evidenced by the change in L*a*b* values. In particular, the ΔE 2000 value of Inventions 5-11 relative to Control 5 implies that the tinted functional compositions changed the color of the foamed, opacifying elements beyond ΔE 2000 values of at least 3.5 units in most embodiments. In the case where TiO₂ was used as a (iii) tinting material (Invention 8) there was a minimum of about 8 units in increase in ΔE 2000 value which arose mainly from a shift in the L* value, indicating a whiter appearance. In the case of Invention 5 (the absence of (i) inorganic or organic spacer particles), the ΔE 2000 value was less than 3.5 because the TiO₂ pigment was not able to remain on the outer surface of the foamed, opacifying element to impart color efficiently. In the case where the (iii) tinting material was a small amount of the green colorant dispersion D-G (Invention 11), there was a 5-fold shift of the a* value and a shift in the ΔE 2000 value greater than 3.5 implying that the color shift was specifically green. When green colorant dispersion D-G was used in combination with TiO₂ (Invention 10) a concomitant shift in the L* value was also observed. When (i) inorganic or organic spacer particles were used without (iii) tinting materials (Invention 12), the ΔE 2000 value was slightly higher than that obtained with Control 1.

In addition to the shift in the color of the foamed, opacifying element having the functional composition, the performance of the foamed, opacifying element under simulated dye sublimation thermal transfer printing conditions show that the presence of the (i) inorganic or organic spacer particles or (ii) solid lubricant can prevent gloss of the coated side of the element when kept in contact with a heated surface and Kapton film. Furthermore, the functional composition also prevented the opacifying layer side from being degraded during the blocking evaluation. In particular, the functional composition comprising (i) inorganic or organic spacer particles greater than 1 μm performed well under the simulated dye sublimation thermal transfer and blocking evaluations.

Thus, with a combination of (i) inorganic or organic spacer particles and a (iii) tinting material in the functional composition, the release properties, blocking properties, and the overall appearance of the foamed, opacifying element can be controlled. In most of the invention examples, the presence of a (iii) tinting material and (ii) solid lubricant or (i) inorganic or organic spacer particles provided a ΔE 2000 value of at least 3.5, thereby providing a desired visual effect.

The invention has been described in detail with particular reference to certain preferred embodiments thereof, but it will be understood that variations and modifications can be obtained within the spirit and scope of the invention.

The invention claimed is:

1. A method for providing a foamed, opacifying element, the method consisting essentially of:
   A) providing a foamable aqueous composition that has at least 35% solids and up to and including 70% solids, and consists essentially of:
   (a) at least 0.05 weight % and up to and including 15 weight % of porous particles, each porous particle comprising a continuous polymeric phase and discrete pores dispersed within the continuous polymeric phase, the porous particles having a mode particle size of at least 2 μm and up to and including 50 μm;
   (b) at least 20 weight % and up to and including 70 weight % of a binder material having a glass transition temperature ($T_g$) of less than 25° C.;
   (c) at least 0.0001 weight % and up to and including 30 weight % of one or more additives comprising a surfactant;
   (d) water;
   (e) at least 0.001 weight % of an opacifying colorant different from all the one or more (c) additives, which opacifying colorant absorbs electromagnetic radiation having a wavelength of at least 380 nm and up to and including 800 nm, all amounts based on the total weight of the foamable aqueous composition;

B) aerating the foamable aqueous composition to provide a foamed aqueous composition having a foam density of at least 0.1 g/cm$^3$ and up to and including 0.5 g/cm$^3$;

C) disposing the foamed aqueous composition onto a first opposing surface of a substrate also having a second opposing surface;

D) drying the foamed aqueous composition, without substantial curing of the binder material, to provide a dry foamed composition on the first opposing surface;

E) densifying the dry foamed composition;

F) curing the dry foamed composition to convert the (b) binder material to a (b') matrix material, wherein E) densifying and F) curing can be carried out in the indicated order or in the opposite order, to provide a foamed, opacifying element having an opacifying layer, and wherein, at any time after D) drying, the method further comprises G) disposing a functional composition onto either the dry foamed composition or the opacifying layer, and drying the disposed functional composition, the functional composition comprising either or both of: (i) inorganic or organic spacer particles having a mode particle size of at least 1 μm and up to and including 100 μm, and which inorganic or organic spacer particles resist melt flow at a pressure of up to and including 100 psi (689.5 kPa) and a temperature of up to and including 220° C.; and (iii) a tinting material comprising one or more pigments, one or more dyes, or a combination thereof, wherein the (i) inorganic or organic spacer particles and the (iii) tinting material are different materials.

2. The method of claim 1, wherein the (iii) tinting material can be present to provide a ΔE 2000 value for the foamed, opacifying element of a least 3.5 relative to a foamed, opacifying element from which the functional composition has been omitted.

3. The method of claim 1, wherein the disposed functional composition is cured.

4. The method of claim 1, comprising G) disposing the functional composition using spray coating, gap coating, roll coating, or coating with an engraved roller.

5. The method of claim 1, wherein the disposed functional composition comprises both the (i) inorganic or organic spacer particles and the (iii) tinting material.

6. The method of claim 1, comprising G) disposing the functional composition between E) densifying and F) curing.

7. The method of claim 1, wherein the foamed, opacifying element is desired to have an L* value greater than 80.

8. The method of claim 1, wherein the (iii) tinting material comprises one or more white pigments that can be titanium dioxide, barium sulfate, calcium carbonate, or a combination of two or more of these materials.

9. The method of claim 1, wherein the (iii) tinting material comprises one or more of a cyan, yellow, magenta, red, green, or blue pigment, and optionally a white pigment.

10. The method of claim 1, wherein the (i) inorganic or organic spacer particles are present in the disposed functional composition at a dry coverage of at least 0.001 g/m$^2$ and up to and including 30 g/m$^2$.

11. The method of claim 1, wherein the disposed functional composition has a dry coverage of at least 0.1 g/m$^2$ and up to and including 50 g/m$^2$.

12. The method of claim 1, wherein the (i) inorganic or organic spacer particles are present in the functional composition and comprise natural or synthetic silica; talc; clay; mica; nylon; a polytetrafluoroethylene; a crosslinked styrenic polymer; a crosslinked polyacrylate or polymethacylate; or a combination of two or more of these materials.

13. The method of claim 1, wherein the functional composition further comprises a (ii) solid lubricant that is a nonliquid wax, a metal ester of a fatty acid, graphite, a silicone-based polymer, a fluoropolymer, or a combination of two or more of these materials, and the (ii) solid lubricant is different from both the (i) inorganic or organic spacer particles and the (iii) tinting material.

14. The method of claim 13, wherein the (ii) solid lubricant is present in the disposed functional composition at a coverage of at least 0.01 g/m$^2$ and up to and including 30 g/m$^2$.

15. The method of claim 1, wherein the functional composition further comprises a biocide, antistatic agent, tactile modifier, visual modifier, alkali metal salt, alkaline earth metal salt, soil resistance agent, a coating aid, or any combination of two or more of these materials.

16. The method of claim 1, wherein the functional composition further comprises an (iv) organic polymeric binder that is a poly(vinyl alcohol), a cellulosic polymer, poly (ethylene oxide), poly(vinyl pyrrolidinone), acrylic polymer latex, polyurethane latex, gelatin or gelatin derivative, gellan, a polysaccharide, or a combination of two or more of these materials.

17. The method of claim 16, wherein the functional composition further comprises a (v) crosslinking agent for the (iv) organic polymeric binder.

18. The method of claim 1, wherein the (b) binder material has a glass transition temperature equal to or less than −10° C.

19. The method of claim 1, further comprising, after G) disposing the functional composition, printing an image on an outer surface of the foamed, opacifying element.

20. The method of claim 19, comprising printing the image using one or more dye sublimation thermal transfer colorants and a dye sublimation thermal transfer process.

21. The method of claim 1, comprising G) disposing the functional composition directly on the opacifying layer.

22. The method of claim 1, wherein the functional composition is a foamed functional composition.

23. The method of claim 1, wherein the opacifying colorant is present in the foamable aqueous composition in an amount of at least 0.001 weight % and up to and including 0.05 weight %, based on the total weight of the foamable aqueous composition.

* * * * *